(12) United States Patent
Navarro Arranz et al.

(10) Patent No.: US 12,077,123 B2
(45) Date of Patent: Sep. 3, 2024

(54) VEHICLE PASSENGER RESTRAINT SYSTEM COMPRISING AN AIRBAG

(71) Applicant: Dalphi Metal Espana, S.A., Vigo (ES)

(72) Inventors: Antonio Navarro Arranz, Valladolid (ES); Ramon Ramos Agustin, Viana de Cega (ES)

(73) Assignee: Dalphi Metal Espana, S.A., Vigo (ES)

( * ) Notice: Subject to any disclaimer, the term of this patent is extended or adjusted under 35 U.S.C. 154(b) by 21 days.

(21) Appl. No.: 16/754,765

(22) PCT Filed: Oct. 8, 2018

(86) PCT No.: PCT/EP2018/077341
§ 371 (c)(1),
(2) Date: Apr. 9, 2020

(87) PCT Pub. No.: WO2019/076673
PCT Pub. Date: Apr. 25, 2019

(65) Prior Publication Data
US 2020/0254955 A1    Aug. 13, 2020

(30) Foreign Application Priority Data

Oct. 20, 2017   (DE) .......................... 102017124579.0

(51) Int. Cl.
*B60R 21/214*  (2011.01)
*B60R 21/201*  (2011.01)
(Continued)

(52) U.S. Cl.
CPC .......... *B60R 21/214* (2013.01); *B60R 21/201* (2013.01); *B60R 21/217* (2013.01);
(Continued)

(58) Field of Classification Search
CPC ... B60R 21/214; B60R 21/201; B60R 21/217; B60R 21/232; B60R 21/237;
(Continued)

(56) References Cited

U.S. PATENT DOCUMENTS

| 2,755,125 A | * | 7/1956 | Hodges | ................... B60R 21/33 280/732 |
| 2,757,040 A | * | 7/1956 | Mclelland | ............... B60R 21/06 280/749 |

(Continued)

FOREIGN PATENT DOCUMENTS

| CN | 106494345 | 3/2017 |
| DE | 102011016310 | 10/2012 |

(Continued)

*Primary Examiner* — Timothy Wilhelm
(74) *Attorney, Agent, or Firm* — TAROLLI, SUNDHEIM, COVELL & TUMMINO L.L.P.

(57) ABSTRACT

A vehicle occupant restraint system comprises an airbag module (12) which includes a frontally acting airbag (16) as well as an inflator (18) which upon activation supplies filling gas for the airbag (16), wherein prior to activation the airbag (16) is folded into an airbag package (14) and is disposed in the area of a sun visor (30) of a vehicle at a roof liner (23) of the vehicle. The airbag package (14) and the inflator (18) are substantially positioned, when viewed in the longitudinal vehicle direction (R), between a pivot axis (28) of the sun visor (30) and a windshield (26) of the vehicle.

17 Claims, 23 Drawing Sheets

(51) Int. Cl.
*B60R 21/217* (2011.01)
*B60R 21/232* (2011.01)
*B60R 21/237* (2006.01)
*B60R 21/26* (2011.01)

(52) U.S. Cl.
CPC .......... *B60R 21/232* (2013.01); *B60R 21/237* (2013.01); *B60R 21/26* (2013.01)

(58) Field of Classification Search
CPC .............. B60R 21/26; B60R 2021/161; B60R 21/2171; B60R 21/213; B60R 1/12; B60R 1/086; B60R 1/088; B60R 1/1207; B60R 11/02; B60R 11/0217; B60R 11/0247; B60R 11/0241; B60R 2001/1223; B60R 2011/0026; B60R 2011/0033; B60Q 3/258; G10L 21/028; G02B 5/08; G02B 17/00; G10K 2210/1282; H04R 2499/13
See application file for complete search history.

(56) References Cited

U.S. PATENT DOCUMENTS

| | | | | |
|---|---|---|---|---|
| 2,806,737 A * | 9/1957 | Maxwell | B60R 21/232 | 280/734 |
| 2,822,187 A * | 2/1958 | Bibbs | B60R 21/08 | 280/752 |
| 2,834,606 A * | 5/1958 | Bertrand | B60R 21/268 | D12/400 |
| 3,443,824 A * | 5/1969 | Dietrich | B60R 21/06 | 296/68.1 |
| 3,617,073 A * | 11/1971 | Landsman | B60R 21/23 | 200/86.5 |
| 3,650,542 A * | 3/1972 | Shimano | B60R 21/08 | 280/749 |
| 3,664,682 A * | 5/1972 | Wycech | B60R 21/08 | 280/734 |
| 3,767,229 A * | 10/1973 | Cain | B60R 21/16 | 280/743.1 |
| 3,801,126 A * | 4/1974 | Knight, IV | B60R 21/276 | 180/90 |
| 3,817,552 A * | 6/1974 | Knight, IV | B60R 21/205 | 280/740 |
| 3,831,975 A * | 8/1974 | Mednikow | B60R 21/08 | 280/749 |
| 3,876,228 A * | 4/1975 | Hawkins | B60R 21/045 | 296/70 |
| 3,930,664 A * | 1/1976 | Parr | B60R 21/08 | 280/743.1 |
| 4,130,298 A * | 12/1978 | Shaunnessey | B60R 21/33 | 280/739 |
| 4,171,140 A * | 10/1979 | Toshihisa | B60R 21/06 | 296/96.14 |
| 4,270,793 A * | 6/1981 | Harasaki | B62D 25/081 | 296/192 |
| 4,530,517 A * | 7/1985 | Miyabayashi | B60K 37/00 | 296/187.05 |
| 4,536,008 A * | 8/1985 | Brown, Jr. | B60R 21/213 | 280/736 |
| 4,635,962 A * | 1/1987 | Miyada | B60R 21/08 | 280/734 |
| 4,718,712 A * | 1/1988 | Nakatani | B62D 21/15 | 296/192 |
| 4,832,287 A * | 5/1989 | Werjefelt | B64D 11/00 | 280/732 |
| 4,950,024 A * | 8/1990 | Watari | B62D 25/081 | 296/192 |
| 5,062,664 A * | 11/1991 | Bishop | B60R 21/201 | 280/732 |
| 5,112,081 A * | 5/1992 | Kesseru | B60R 22/14 | 296/96 |
| 5,232,244 A * | 8/1993 | Itoh | B60R 21/08 | 160/370.21 |
| 5,242,191 A * | 9/1993 | Faigle | B60R 21/216 | 280/732 |
| 5,259,642 A * | 11/1993 | Muller | B60R 21/205 | 280/732 |
| 5,419,088 A * | 5/1995 | Raymond | B60J 1/08 | 52/204.591 |
| 5,588,672 A * | 12/1996 | Karlow | B60R 21/232 | 280/730.2 |
| 5,602,734 A * | 2/1997 | Kithil | B60R 21/213 | 280/735 |
| 5,819,408 A * | 10/1998 | Catlin | B62D 21/15 | 296/205 |
| 5,992,877 A * | 11/1999 | Gray | B60R 21/23 | 280/743.1 |
| 6,095,273 A * | 8/2000 | Aboud | B60R 21/045 | 296/70 |
| 6,106,000 A * | 8/2000 | Stewart | B60R 21/213 | 280/740 |
| 6,164,685 A * | 12/2000 | Fischer | B60R 21/2165 | 280/732 |
| 6,179,366 B1 * | 1/2001 | Hansz | B60J 3/023 | 296/214 |
| 6,224,087 B1 * | 5/2001 | Stutz | B60R 21/213 | 280/730.2 |
| 6,367,872 B1 * | 4/2002 | Bohm | B62D 65/14 | 296/210 |
| 6,382,660 B1 * | 5/2002 | Starner | B60R 21/213 | 280/730.2 |
| 6,431,586 B1 * | 8/2002 | Eyrainer | B60R 21/213 | 280/732 |
| 6,460,878 B2 * | 10/2002 | Eckert | B60R 21/2342 | 280/743.1 |
| 6,467,563 B1 * | 10/2002 | Ryan | B60R 21/36 | 180/274 |
| 6,502,854 B2 * | 1/2003 | Mueller | B60R 21/214 | 180/281 |
| 6,588,793 B2 * | 7/2003 | Rose | B60R 21/237 | 280/728.2 |
| 6,672,619 B1 * | 1/2004 | Ennerdal | B60R 21/08 | 280/751 |
| 6,702,322 B2 * | 3/2004 | Eyrainer | B60R 21/231 | 280/732 |
| 6,722,691 B1 * | 4/2004 | Håland | B60R 21/233 | 280/743.2 |
| 6,808,198 B2 * | 10/2004 | Schneider | B60R 21/237 | 280/743.1 |
| 6,913,280 B2 * | 7/2005 | Dominissini | B60R 21/213 | 296/214 |
| 6,921,121 B2 * | 7/2005 | Schneider | B60J 3/0204 | 296/97.1 |
| 6,948,736 B2 * | 9/2005 | DePottey | B60R 21/214 | 280/728.2 |
| 6,966,579 B2 * | 11/2005 | Schneider | B60R 21/2338 | 280/730.2 |
| 6,971,670 B1 * | 12/2005 | Eriksson | B60R 21/231 | 280/739 |
| 7,000,944 B2 * | 2/2006 | Bakhsh | B60R 21/213 | 280/743.1 |
| 7,000,945 B2 * | 2/2006 | Bakhsh | B60R 21/213 | 280/728.2 |
| 7,004,501 B2 * | 2/2006 | Schneider | B60R 21/237 | 280/743.1 |
| 7,029,030 B2 * | 4/2006 | Amamori | B60R 21/01512 | 280/743.1 |
| 7,055,852 B2 * | 6/2006 | Bakhsh | B60R 21/235 | 280/743.1 |
| 7,108,279 B2 * | 9/2006 | Rensinghoff | B60R 21/231 | 280/732 |
| 7,125,069 B2 * | 10/2006 | Cacucci | B60R 21/02 | 280/730.2 |
| 7,152,873 B2 * | 12/2006 | Peng | B60R 21/232 | 280/730.1 |
| 7,163,229 B2 * | 1/2007 | Hasebe | B60R 21/233 | 280/730.1 |
| 7,174,986 B2 * | 2/2007 | Takimoto | B60R 21/2338 | 180/274 |

(56) References Cited

U.S. PATENT DOCUMENTS

| | | | | |
|---|---|---|---|---|
| 7,185,913 | B2* | 3/2007 | Bakhsh | B60R 21/2338 280/743.1 |
| 7,213,865 | B2* | 5/2007 | Torii | B29C 49/20 296/97.1 |
| 7,296,822 | B2* | 11/2007 | Bakhsh | B60R 21/213 280/743.1 |
| 7,331,597 | B2* | 2/2008 | Williams | B60R 21/261 280/743.1 |
| 7,380,815 | B2* | 6/2008 | Rose | B60R 21/231 280/730.2 |
| 7,508,406 | B2* | 3/2009 | Oehrlein | C03B 33/0222 296/84.1 |
| 7,552,964 | B2* | 6/2009 | Saito | B62D 25/081 296/192 |
| 8,231,140 | B2* | 7/2012 | Maripudi | B60R 21/2338 280/740 |
| 8,236,217 | B2* | 8/2012 | Evans | B32B 38/0012 425/388 |
| 8,240,706 | B2* | 8/2012 | Bustos Garcia | B60R 21/261 280/728.2 |
| 8,480,122 | B2* | 7/2013 | Ohara | B60R 21/205 280/729 |
| 8,485,553 | B1* | 7/2013 | Kuhne | B60R 21/205 280/743.2 |
| 9,381,948 | B2* | 7/2016 | Takei | B62D 25/081 |
| 9,428,129 | B2* | 8/2016 | Crona | B60R 19/34 |
| 9,452,785 | B2* | 9/2016 | Tsuneyama | B62D 21/157 |
| 9,676,361 | B2* | 6/2017 | Smith | B60R 21/231 |
| 9,771,049 | B2* | 9/2017 | Lee | B60R 21/232 |
| 9,993,999 | B2* | 6/2018 | Alonso Vazquez | B32B 17/10761 |
| 10,029,543 | B2* | 7/2018 | Egusa | B60J 3/0282 |
| 10,065,591 | B2* | 9/2018 | Debler | B60R 21/2176 |
| 10,093,359 | B2* | 10/2018 | Vigil | B62D 25/08 |
| 10,279,770 | B2* | 5/2019 | Faruque | B60R 21/2342 |
| 10,328,886 | B2* | 6/2019 | Peyre | B60R 21/261 |
| 10,421,497 | B2* | 9/2019 | Takii | B62D 25/081 |
| 10,457,239 | B2* | 10/2019 | Schneider | B60R 21/233 |
| 10,864,804 | B2* | 12/2020 | Huff | B60J 3/0204 |
| 11,351,955 | B2* | 6/2022 | Peyre | B60R 21/237 |
| 2001/0045728 | A1* | 11/2001 | Kansteiner | B60R 21/2165 280/732 |
| 2002/0024200 | A1 | 2/2002 | Eckert et al. | |
| 2003/0001366 | A1* | 1/2003 | Debler | B60H 1/00564 280/732 |
| 2003/0132621 | A1* | 7/2003 | Arieth | B60R 21/205 280/732 |
| 2004/0090050 | A1* | 5/2004 | Dominissini | B60R 21/213 280/730.1 |
| 2004/0100074 | A1* | 5/2004 | Bakhsh | B60R 21/232 280/730.1 |
| 2004/0188991 | A1* | 9/2004 | Schneider | B60R 21/2338 280/743.2 |
| 2004/0251668 | A1* | 12/2004 | Schneider | B60R 21/237 280/743.1 |
| 2005/0001412 | A1* | 1/2005 | Schneider | B60R 21/232 280/730.1 |
| 2005/0040630 | A1* | 2/2005 | Fischer | B60R 21/2165 280/732 |
| 2006/0071458 | A1 | 4/2006 | Sendelbach et al. | |
| 2010/0225096 | A1* | 9/2010 | Bustos Garcia | B60R 21/214 280/730.1 |
| 2011/0076435 | A1* | 3/2011 | Tachibana | B62D 25/081 428/192 |
| 2012/0207367 | A1 | 8/2012 | Kneepkens et al. | |
| 2013/0091779 | A1* | 4/2013 | Dominique | B60J 1/008 52/1 |
| 2013/0234421 | A1 | 9/2013 | Honda et al. | |
| 2015/0158450 | A1 | 6/2015 | Kawamura et al. | |
| 2017/0043738 | A1* | 2/2017 | Peyre | B60R 21/214 |
| 2017/0113646 | A1 | 4/2017 | Lee et al. | |
| 2017/0174173 | A1* | 6/2017 | Peyre | B60R 21/214 |
| 2019/0054888 | A1* | 2/2019 | Fukawatase | B60R 21/206 |
| 2019/0092268 | A1* | 3/2019 | Ishida | B60R 21/205 |
| 2019/0299912 | A1* | 10/2019 | Tanaka | B60R 21/233 |
| 2020/0254959 | A1* | 8/2020 | Navarro Arranz | B60R 21/206 |
| 2020/0276954 | A1* | 9/2020 | Navarro Arranz | B60R 21/237 |

FOREIGN PATENT DOCUMENTS

| | | |
|---|---|---|
| JP | 117605 | 5/1995 |
| WO | 2010015342 | 2/2010 |
| WO | 2015114230 | 8/2015 |
| WO | 2016045775 | 3/2016 |

* cited by examiner

VEHICLE PASSENGER RESTRAINT SYSTEM COMPRISING AN AIRBAG

RELATED APPLICATIONS

This application corresponds to PCT/EP2018/077341, filed Oct. 8, 2018, which claims the benefit of German Application No. 10 2017 124 579.0, filed Oct. 20, 2017, the subject matter of which are incorporated herein by reference in their entirety.

BACKGROUND OF THE INVENTION

The invention relates to a vehicle occupant restraint system comprising an airbag module.

For protecting the vehicle occupants, very successfully airbags have been employed. They develop the best protective effect when the vehicle occupant to be absorbed is located at a defined position relative to the inflated airbag. The position of the vehicle occupant in the vehicle interior is not exactly determined, however. In order to cope with this problem, airbags are being discussed which are disposed in the roof area of the vehicle and which deploy along the windshield and across the instrument panel.

SUMMARY OF THE INVENTION

It is the object of the invention to improve a vehicle occupant restraint system comprising an airbag module disposed in the roof area of the vehicle especially regarding deployment and positioning of the inflated airbag.

This object is achieved by a vehicle occupant restraint system comprising the features of claim 1. The airbag module of the vehicle occupant restraint system comprises a frontally acting airbag as well as an inflator which upon activation supplies filling gas for the airbag. Prior to activation, the airbag is folded into an airbag package and is arranged in the area of a sun visor of a vehicle at a roof liner of the vehicle. At least the airbag package and especially also the inflator is substantially positioned, when viewed in the longitudinal vehicle direction, between a pivot axis of the sun visor and a windshield of the vehicle. Hence, in the longitudinal vehicle direction, when viewed from the front end to the rear end of the vehicle, the airbag package and preferably also the inflator are located ahead of the pivot axis of the sun visor, i.e. offset against the pivot axis of the sun visor toward the vehicle front end. It has turned out that in such arrangement deployment of the airbag is possible without any interaction with the sun visor, the attachments thereof or any other rigid parts of the roof lining of the vehicle. In addition, it has turned out that expensively designed module casings or guiding plates for defining a passage for the deploying airbag can at least largely be dispensed with.

A load-bearing fastening of the inflator may be implemented on the module carrier and/or directly on the vehicle body, e.g. on the roof rail. In particular, fastening bolts radially projecting from the inflator are provided for this purpose, as this is conventionally known.

In general, the inflator is arranged in the airbag module so that its longitudinal axis is approximately normal to the longitudinal vehicle direction and to a longitudinal module direction of the airbag module. The longitudinal module direction usually coincides at least approximately with a deployment direction of the airbag out of the airbag module.

In order to exploit the limited space between the windshield and the sun visor, the airbag module may have a larger dimension transversely to the longitudinal vehicle direction than in the longitudinal vehicle direction.

In the inflated state, the airbag extends for example from the area of the sun visor along the windshield and over the instrument panel toward a vehicle occupant. In this way, the airbag forms a large baffle and is capable of absorbing the vehicle occupant at various positions. Due to the deployment from the roof liner along the windshield from the top to the bottom into the vehicle interior, the deploying airbag moves in an area where normally a vehicle occupant is not expected to be present.

The shape of the airbag is preferably selected so that the airbag in the completely inflated state has a first free end which constitutes a lower end of the airbag and of the baffle in the vehicle interior and a second free end which is located in the area of a lower end of a windshield of the vehicle, especially at the transition from the windshield to the instrument panel.

An outer inflatable leg of the airbag may be defined in the area of the first free end and of the baffle, and an inner inflatable leg of the airbag may be defined in the area of the second free end and of the windshield. This imparts approximately a Y-shape or T-shape to the airbag in the inflated state.

The folding of the airbag package and/or the use of a tether during deployment and inflation of the airbag allows to initially fill the outer leg only, while the inner leg still remains unfilled for the time being. In this way, exact and quick positioning of the airbag inside the vehicle interior can be achieved.

Preferably, the airbag package is surrounded by a flexible wrapping. A rigid module casing completely enclosing the airbag package may be dispensed with so that the flexible wrapping separates the airbag package in portions from the environment without any further casing parts being interposed. The wrapping may be made from airbag fabric as it need not withstand any major loads.

Especially, the airbag module may be located beneath a roof lining, wherein only the roof lining forms a lower delimitation of the passage for the exiting airbag. The roof lining may be configured so that, when the airbag moves into the vehicle interior, it yields without developing any significant guiding effect. Rigid components which direct the airbag into the vehicle interior such as portions of a module casing or specifically designed guiding plates usually are not required.

For connecting the airbag module to the vehicle, preferably a rigid module carrier is provided which is tightly connected to a roof rail of the vehicle. The module carrier comprises a holder C-shaped in cross-section into which the inflator is inserted, wherein a passenger-side arm of the holder does not extend beyond the inflator in the longitudinal vehicle direction toward the vehicle front end. It has turned out that this geometry is suited for maintaining the inflator in the desired position during filling and deployment of the airbag so that, exactly in the initial filling phase of the airbag, the latter adopts the intended deployment direction. A guiding plate extending substantially over the inflator toward the vehicle front end is not required, however.

In a preferred embodiment, the airbag package is folded so that a main package which is constituted by a restraint part of the airbag and comprises a major part of the airbag volume, as well as a connecting portion is formed which comprises a neck of the airbag and connects the main package to the inflator, with the neck being folded into one to three zigzag folds. The main package and the connecting portion are separately folded, for example, and may be interconnected by an unfolded short piece of the airbag. The main package and the connecting portion then form two separately folded portions.

The main package and the connecting portion are preferably folded and arranged in the airbag package so that upon activation of the inflator first the neck will fill, thus causing the main package to be slid into the vehicle interior in a still at least partially folded state. This minimizes interaction of the airbag with parts of the vehicle body or of the roof liner during deployment.

The main package is folded, for example, in such way that the first free end is folded back to the inflation end. Moreover, the two lateral portions of the restraint part may be folded back to the center and may subsequently be rolled up. This helps fill at first the outer leg of the airbag extending from the inflation end to the second free end of the airbag which in the inflated state is located approximately in the transition from the windshield to the instrument panel. On the other hand, initially the filling gas substantially does not yet flow into the inner leg of the airbag extending from the inflation end to the first free end of the airbag. This is achieved by the folding of the restraint part of the airbag and by the tether.

From a particular fill level which is reached after a predetermined first period following activation of the inflator, the tether becomes detached due to the acting tensile forces and also the inner leg of the airbag as well as the first free end of the airbag are completely inflated.

In the deployed and inflated airbag, the neck may be narrower than the restraint part in the transverse vehicle direction. Furthermore, the neck usually is definitely shorter than the restraint part of the airbag, when viewed in the longitudinal direction of the airbag. Due to its position close to the roof liner, the neck does not contribute to the restraining effect of the airbag. Minimizing the volume of the neck helps save filling volume and space.

Due to the smaller dimensions in the transverse vehicle direction, also the connecting portion within the airbag package may be narrower than the main package. Of preference, the width of the neck and of the connecting portion approximately corresponds to the length of the inflator, wherein preferably a conventionally known tubular inflator is employed.

In order to connect the inflator to the airbag, the airbag may include an inflation end having an inserting hole for the inflator. The inserting hole may be closed, for example, by two opposite tabs of the airbag, with each tab being adapted to be fastened separately to the inflator. Thus, separate fixing of the airbag to the inflator may be omitted. The tabs enable simple and low-cost, though nevertheless substantially gas-tight assembly of the inflator on the airbag by inserting the inflator into the inflation end and winding both tabs around the same. In this way, a separate bag on the airbag into which the inflator is inserted can be saved.

Each of the tabs preferably includes at least one fastening hole for accommodating a fastening bolt projecting from the inflator. In this manner, the two tabs can be wound around the inflator so that a gas-tight wrapping is obtained.

The inflator is preferably directly inserted in the inflation end of the airbag and is tightly connected to the airbag, as the two opposite tabs of the airbag with fastening holes being formed therein are pulled over the fastening bolts projecting from the inflator and in this way seal the inflating hole in a gas-tight manner.

The free end areas of the tabs including the fastening holes then lie directly on top of each other at the rear side of the inflator and are overlapping there.

It is possible to provide the airbag in the area of the tabs with reinforcing layers and/or a suitable coating so as to increase the gas tightness and the temperature resistance.

Any further mounting of the airbag to the airbag module has turned out to be superfluous so that the fixation of the airbag on the inflator via the two tabs may be the only connection of the airbag to the airbag module, and the connection of the airbag tightly to the vehicle is established solely via the fastening bolts of the inflator.

Of preference, the inflator includes, in addition to the at least one fastening bolt, another positioning bolt projecting from the outer periphery thereof which positioning bolt is disposed so that a definite positioning of the inflator within the airbag module is possible. Each tab of the inflation end at the airbag includes another hole for accommodating the positioning bolt so that the position of the inflator relative to the airbag is definitely predetermined and faulty assembly is excluded according to the Poka-Yoke principle.

In a possible configuration of the invention, the vehicle occupant restraint system comprises an airbag module which is mounted in the area of the roof liner of the vehicle on the passenger side approximately centrally relative to the passenger seat, when viewed in the transverse vehicle direction, and includes an airbag folded into an airbag package which, in the case of restraint, deploys between the windshield and the passenger so as to frontally absorb the passenger. The airbag package is arranged between the pivot axis of the sun visor and the windshield of the vehicle.

For fastening the airbag module to the roof rail, the inflator is accommodated in a holder C-shaped in cross-section of a module carrier mounted on the roof rail, wherein the vehicle interior-side arm of the C-shaped holder does not substantially project from the inflator, however.

In the case of restraint, the inflator is activated and filling gas at first flows into the connecting portion in which a neck of the airbag is folded in a mere zigzag folding. This causes the neck to stretch, and by the resulting increase in volume the still at least largely folded main package in which a restraint part of the airbag comprising a major part of the airbag volume is folded is slid from beneath the roof lining into the vehicle interior. The inflator, the connecting portion and the main package are located on a straight line along the longitudinal module direction.

While the restraint part of the airbag deploys out of the main package, a first free end of the airbag may initially be withheld by a tether connecting the first free end and the inflator.

In the completely inflated state of the airbag, the first free end extends beyond the instrument panel in the direction of the vehicle occupant, and between the first free end and the inflator-side inflation end of the airbag a baffle is formed on the side facing the vehicle occupant.

The airbag is substantially composed of three outer wall portions a first outer wall portion of which extends from the inflation end to the second free end and forms a bearing surface for bearing against the windshield. The second outer wall portion connects the first free end to the second free end and in the inflated state rests on and above the instrument panel, and the third outer wall portion connects the first free end to the inflation end and in the inflated state constitutes the baffle.

The folded airbag package is accommodated, together with the inflator, in a wrapping which is fastened on the inflator side by two retaining tabs to the fastening bolts of the inflator, while the main package of the folded airbag is inserted in a holding bag and there is retained via an airbag package fixation formed at the wrapping. The airbag package fixation includes meshing first and second fixing elements which constitute a connector and both of which are exclusively formed from the material of the wrapping, especially from airbag fabric. The connecting portion is located outside the holding bag and in the folded state is fixed by the retaining tabs. For fixation on the vehicle, the wrapping includes one or more fixing portions which also enable prefixing to the vehicle body, thus allowing for exact positioning of the airbag module and convenient mounting of the load-bearing fixations.

In the bottom of the holding bag of the wrapping a weakened zone is provided, for example, through which the main package of the folded airbag package may exit the airbag module and may deploy out of the roof lining into the vehicle interior.

All features described in connection with the invention can also individually be realized independently of each other or in any suitable combinations being at the discretion of those skilled in the art.

BRIEF DESCRIPTION OF THE DRAWINGS

Hereinafter, the invention shall be described in detail by way of an embodiment with reference to the enclosed Figures, wherein.

DESCRIPTION

Figure 1:
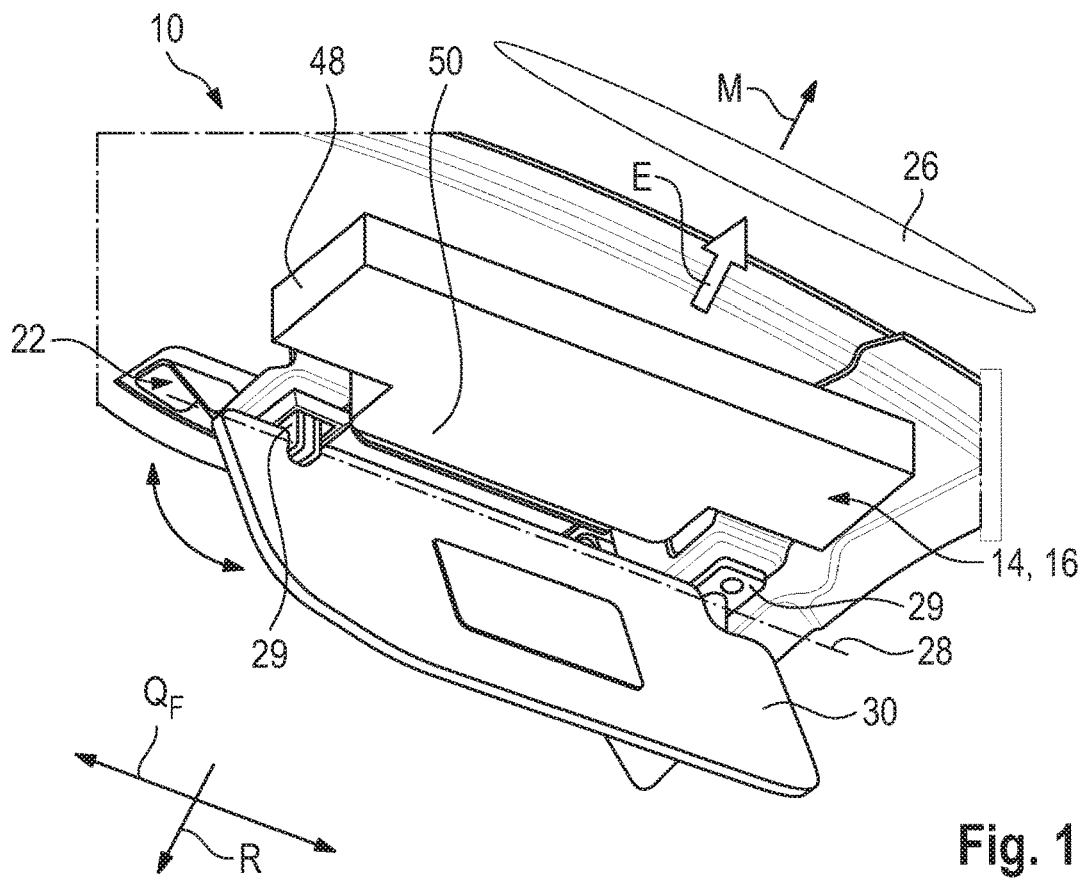
FIG. 1 shows a schematic perspective view of a vehicle occupant restraint system according to the invention comprising an airbag module mounted on a roof of the vehicle.
Figure 2:
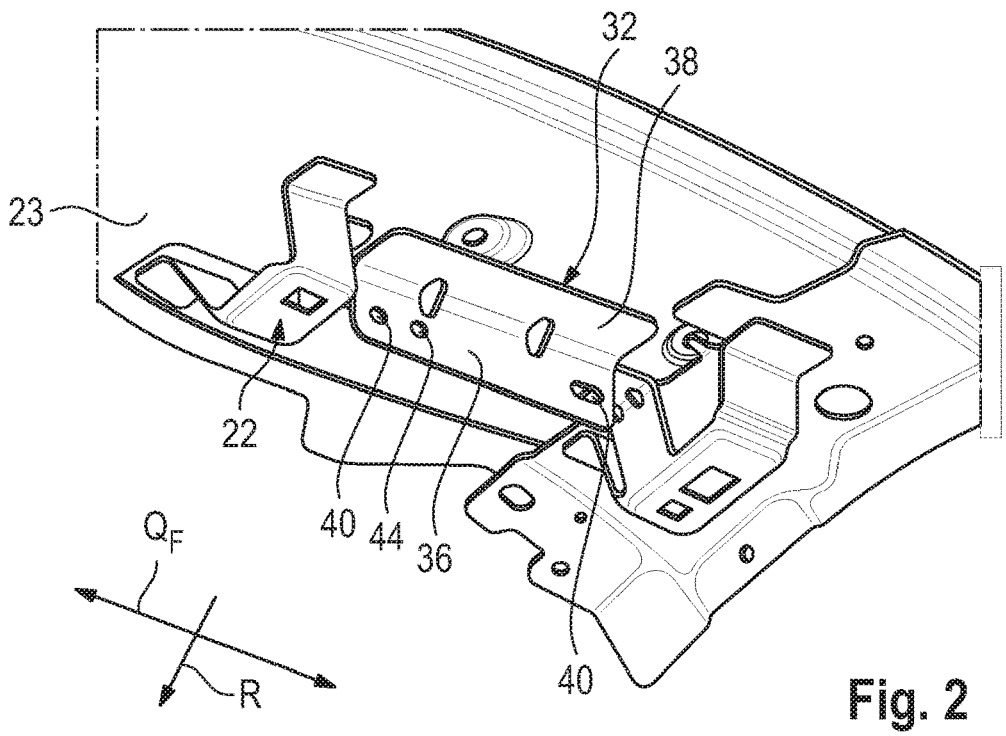
FIG. 2 shows a module carrier of the airbag module of FIG. 1 mounted on the vehicle roof.
Figure 3:
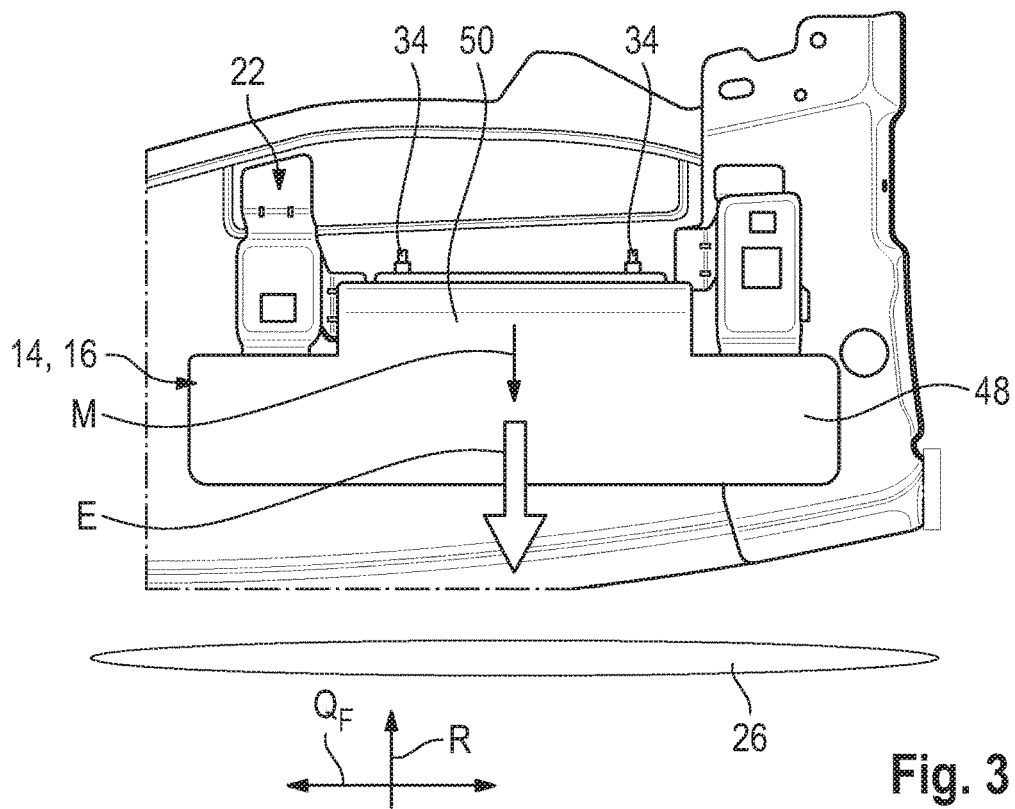
FIG. 3 shows a top view onto the airbag module of FIG. 1.
Figure 4:
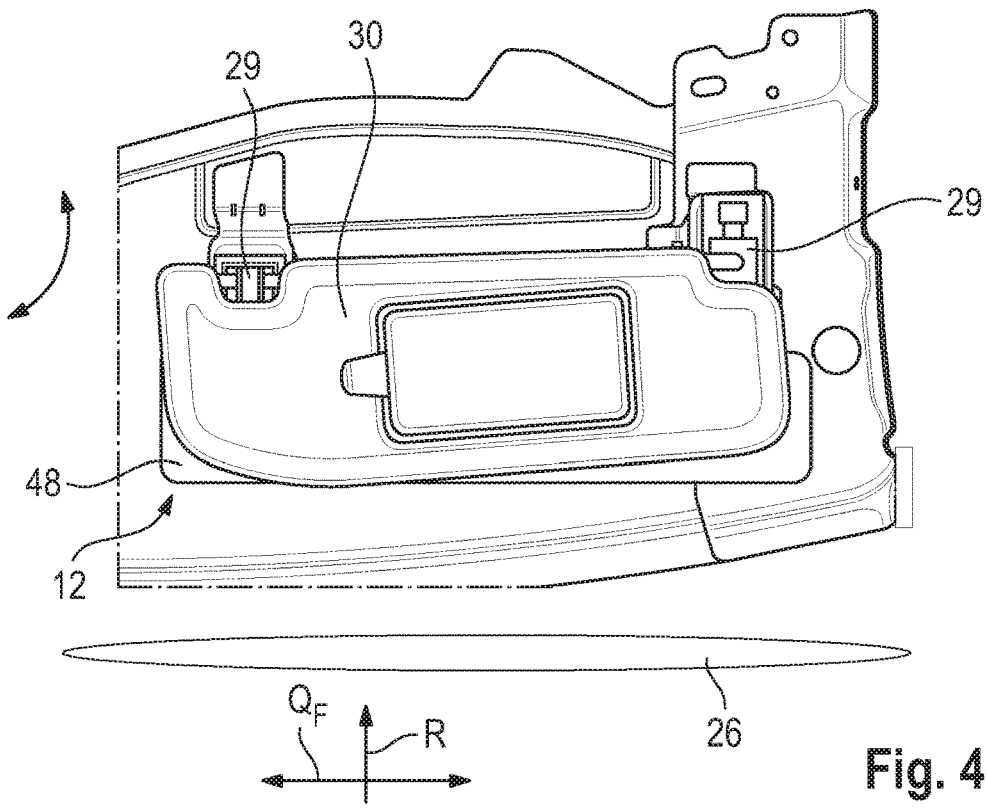
FIG. 4 shows the representation of FIG. 3 where additionally the sun visor is illustrated.
Figure 5:
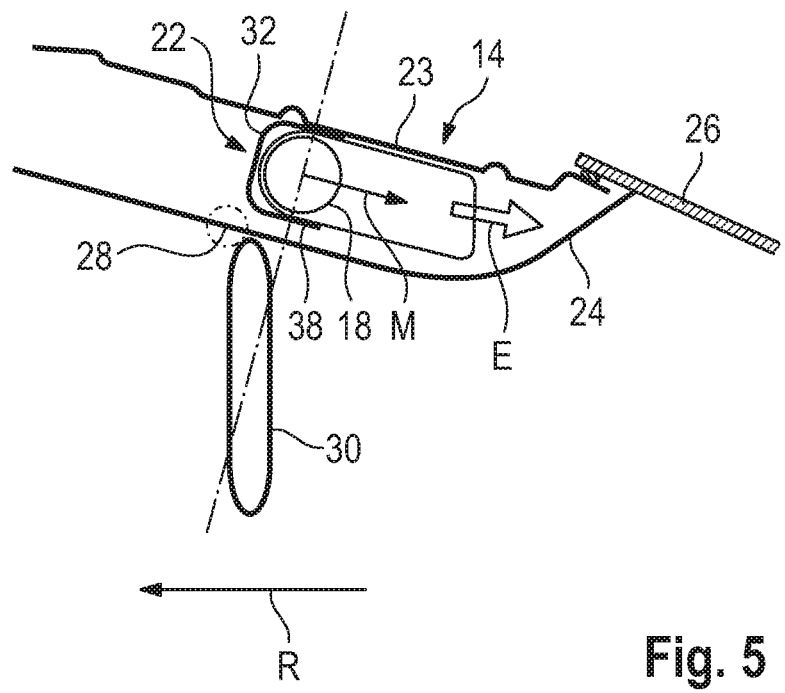
FIG. 5 shows a schematic sectional view of the vehicle occupant restraint system of FIG. 1 installed in the vehicle.
Figure 6:
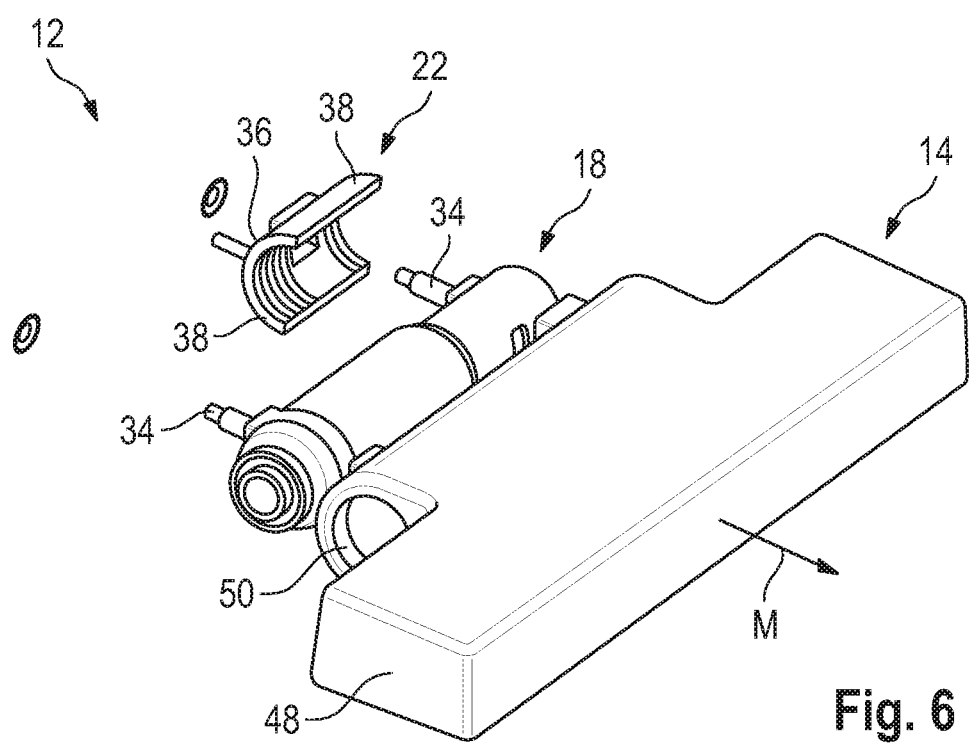
FIG. 6 shows a schematic exploded view of the airbag module of FIG. 1.

FIGS. 1 to 7 illustrate the structure of a vehicle occupant restraint system 10 which in this example is designed to protect a passenger especially of a passenger car during frontal crash.

The vehicle occupant restraint system 10 comprises an airbag module 12 (cf. especially FIGS. 5 to 7) including a frontally acting airbag 16 folded into an airbag package 14 as well as an inflator 18 which supplies filling gas for inflating the airbag 16. The inflator 18 is inserted in the airbag 16 and thus integrated in the airbag package 14.

Figure 29:
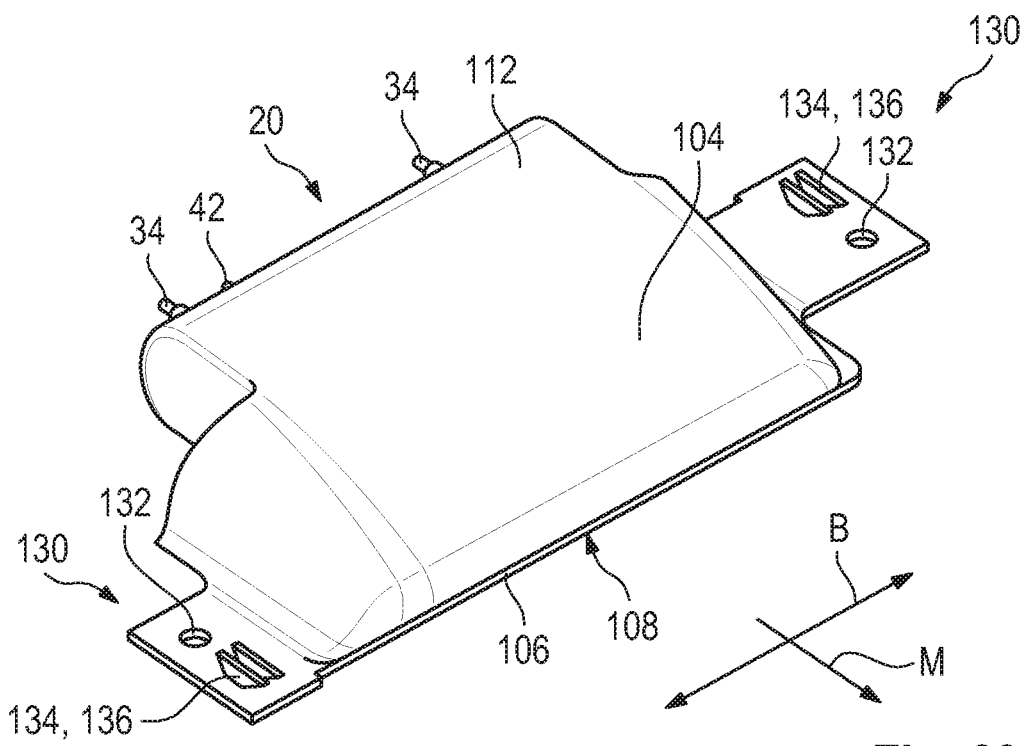
FIG. 29 shows a schematic perspective representation of the airbag package of FIG. 28 inserted in a wrapping.

The airbag package 14 and the inflator 18 are accommodated in a flexible wrapping 20 (see e.g. FIGS. 7 and 29) which will be described in detail further below and which has been omitted in FIGS. 1 to 6 for reasons of clarity.

Further, a module carrier 22 is provided (see FIGS. 2 and 6, for instance) via which the airbag module 12 is mounted tightly to the vehicle, for example to a roof rail 23 or any other rigid component in the roof area of the vehicle. The module carrier 22 is a formed sheet part, for example.

The airbag module 12 is arranged beneath a roof liner 24 (cf. e.g. FIG. 5), wherein it is located, when viewed along the longitudinal vehicle direction R, between a windshield 26 of the vehicle and a pivot axis 28 and, resp., the attachments 29 of a sun visor 30. The sun visor 30 may be pivoted about the pivot axis 28 as indicated e.g. in FIG. 1. The pivot axis 28 is not continuously physically realized. Instead, the sun visor 30 is pivotally attached to the roof liner by two attachments 29 (see FIGS. 1 and 4), wherein usually the sun visor 30 may be unhooked at the vehicle inward one of the two attachments 29 so as to laterally fold away the sun visor.

At least the folded airbag package 14 and, where appropriate, also the inflator 18 is/are located in the vehicle direction, when viewed from the vehicle front end to the vehicle rear end, ahead of the pivot axis 28 of the sun visor 30.

A deployment direction E of the airbag 16 is directed along the longitudinal vehicle direction R in the direction of the vehicle front end and initially extends approximately in parallel to the vehicle roof and to the windshield 26.

The airbag module 12 is located, when viewed in the transverse vehicle direction $Q_F$, on the passenger side approximately centrally above a passenger seat (not shown) so that the airbag 16 is capable of frontally absorbing the passenger. The airbag module 12 thus is disposed in the transverse vehicle direction $Q_F$ distant from the vehicle doors.

The module carrier 22 includes a holder 32 C-shaped in cross-section and encompassing the inflator 18 at the inflator-side end side of the airbag package 14.

The inflator 18 in this case is a known elongate tubular inflator, with two fastening bolts 34 radially projecting from the cylindrical outside thereof. The fastening bolts 34 are located on a rear side of the inflator 18, on the opposite front side discharge orifices (not shown) are provided through which the filling gas leaves the inflator 18 and flows directly into the airbag 16.

The inflator 18 is disposed in the airbag module 12 so that its longitudinal axis extends transversely to the longitudinal vehicle direction R approximately in the transverse vehicle direction $Q_F$ and thus approximately normal to a longitudinal module direction M and the deployment direction E of the airbag 16. The longitudinal module direction M can be defined approximately by an extension of a diameter of the inflator 18 which is determined by the fastening bolts 34.

In the module carrier 22, more exactly speaking in a longitudinal side 36 of the C-shaped holder 32 located between the two arms 38 of the C, fastening holes 40 (cf. FIG. 2) are provided through which the fastening bolts 34 are passing so as to fasten the inflator 18 and the airbag package 14 tightly to the module carrier 22. On the rear side, the fastening bolts 34 may be secured by nuts, for example.

Figure 7:
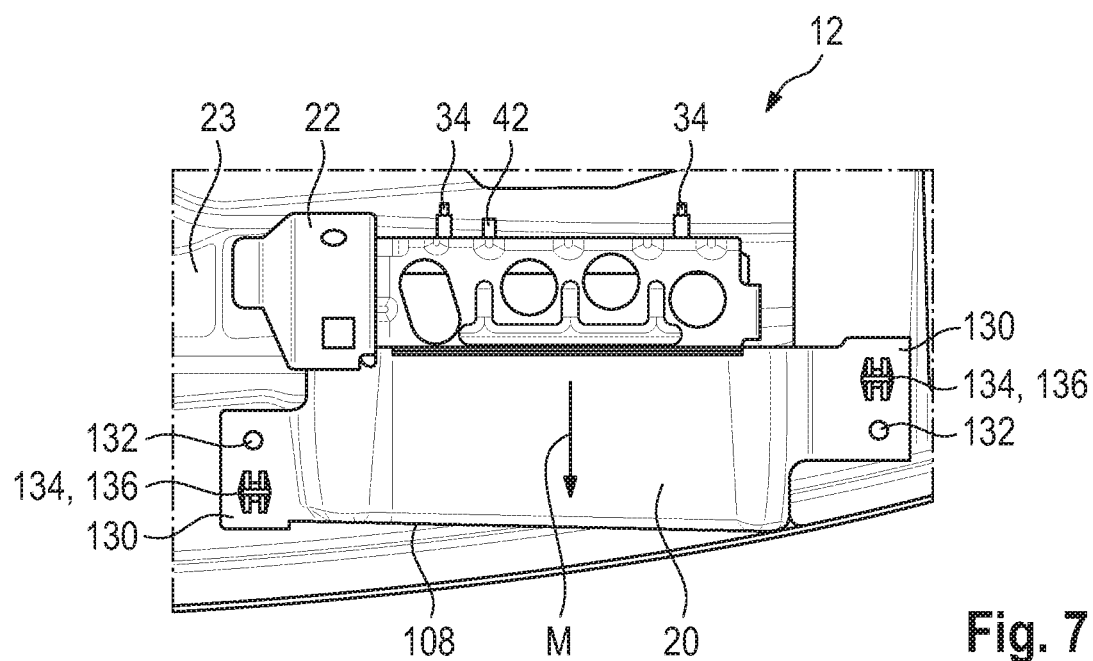
FIG. 7 shows a schematic top view onto the airbag module of FIG. 1 mounted on the roof.

In addition to the two fastening bolts 34, another bolt constituting a positioning bolt 42 is provided (see e.g. FIG. 7). A corresponding hole 44 is provided in the module carrier 22 (see FIG. 2). According to the Poka-Yoke principle, said positioning bolt 42 serves for preventing faulty assembly of the inflator 18.

Upon deployment of the airbag 16, filling gas flows from the inflator 18 into the airbag 16 through an inflation end 46 which is fastened on the inflator 18 as will be described in detail below. The pressure of the filling airbag 16 helps open the roof liner 24 either at a weakened zone or, for example, at the transition to the windshield 26 and allows the airbag 16 to exit into the vehicle interior. Accordingly, the roof liner 24 forms a lower delimitation of a passage for the airbag 16. An upper delimitation of said passage may be predefined by the roof rail 23. In this example, no further rigid guiding part such as e.g. a guiding plate is provided between the airbag 16 and the roof liner 24.

The arm 38 of the C-shaped holder 32 on the vehicle interior side does not extend, in the longitudinal vehicle direction R, beyond the outer wall of the inflator 18 and merely increases the stability of the module carrier 22 so that the latter deforms only insignificantly during deployment of the airbag 16, but does not contribute to directing the airbag 16 by directly contacting the airbag 16.

Due to its position on the roof rail 23, the deploying airbag 16 does not contact the sun visor 30 or the attachments 29 thereof, either, while it exits into the vehicle interior.

Figure 8:
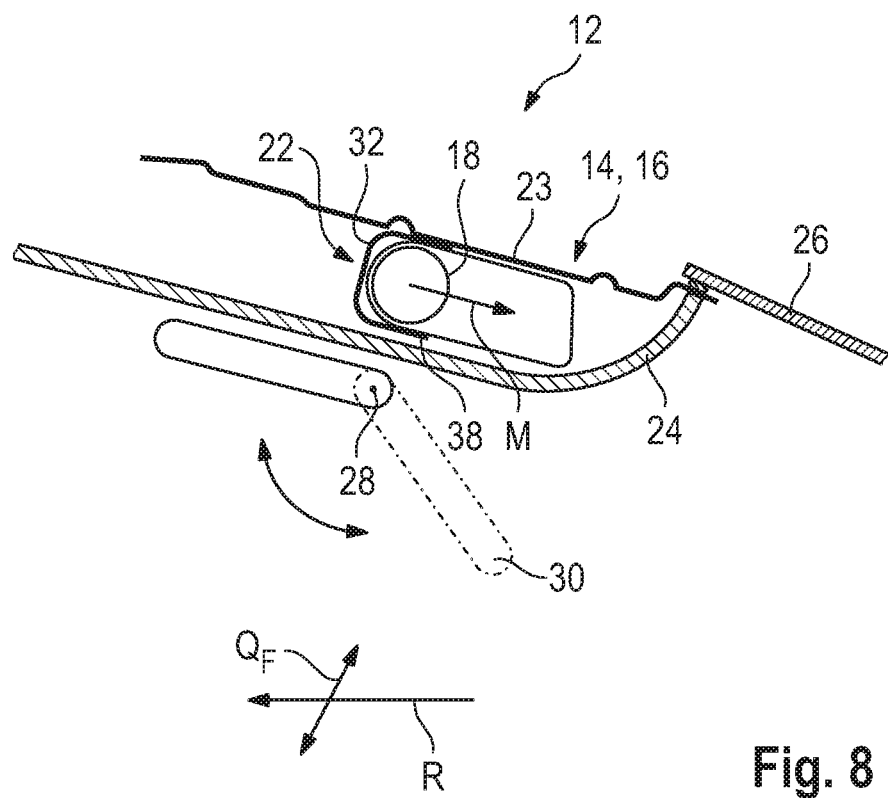
FIGS. 8 and 9 show the vehicle occupant restraint system of FIG. 1 in a schematic sectional view prior to deployment of the airbag and during the initial deployment phase of the airbag.
Figure 9:
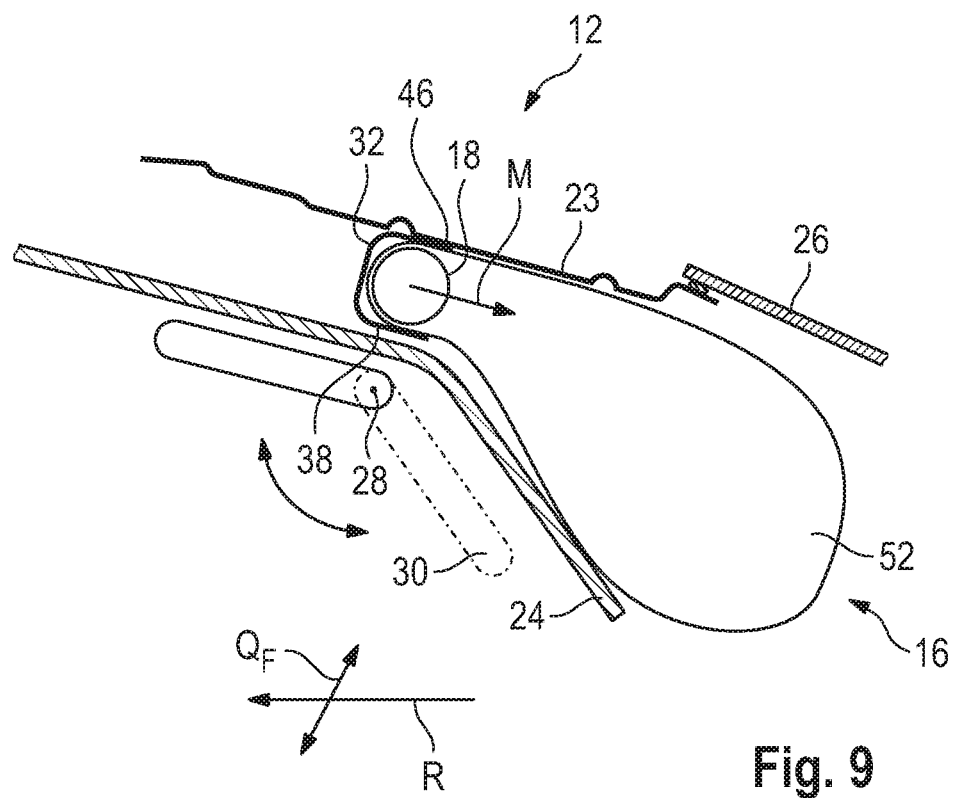

The initial deployment of the airbag 16 is illustrated in FIGS. 8 and 9.

FIGS. 10 to 17 show the deployment and the inflation of the airbag 16 in more detail. Although in FIGS. 11 to 17 the steering wheel is visible, this is only due to the lateral view chosen for representation. The airbag 16 deploys exclusively on the passenger side in this example and laterally beside the steering wheel.

Figure 10:
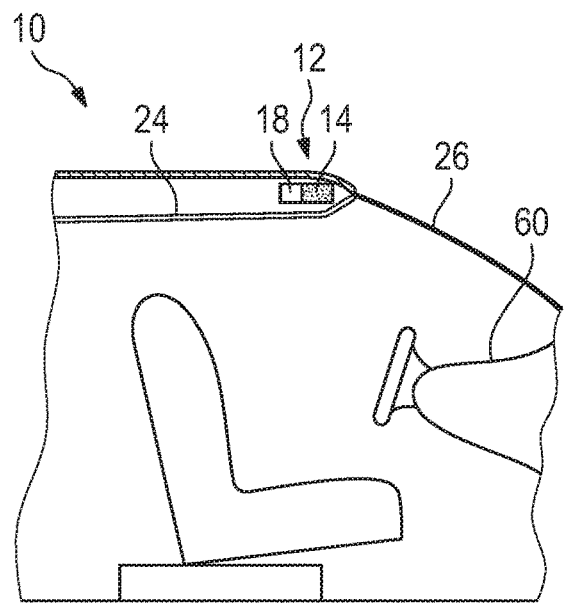
FIGS. 10 to 17 show the inflating operation of the airbag of the airbag module of FIG. 1 from the state prior to activation of the vehicle occupant restraint system to the completely inflated airbag in a schematic sectional view.
Figure 10:
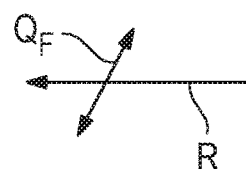

FIG. 10 shows the initial state prior to activation of the vehicle occupant restraint system 10.

The airbag package 14 initially lies folded beneath the closed roof liner 24. The airbag package 14 comprises two separately folded portions, viz. a main package 48 and a connecting portion 50 (indicated e.g. in FIGS. 1 and 3).

In the main package 48 a restraint part 52 of the airbag 16 is folded which in the deployed and inflated state covers the major part of the airbag volume and which substantially determines the restraining effect of the airbag 16. This is evident e.g. from FIGS. 17 and 19.

Figure 19:
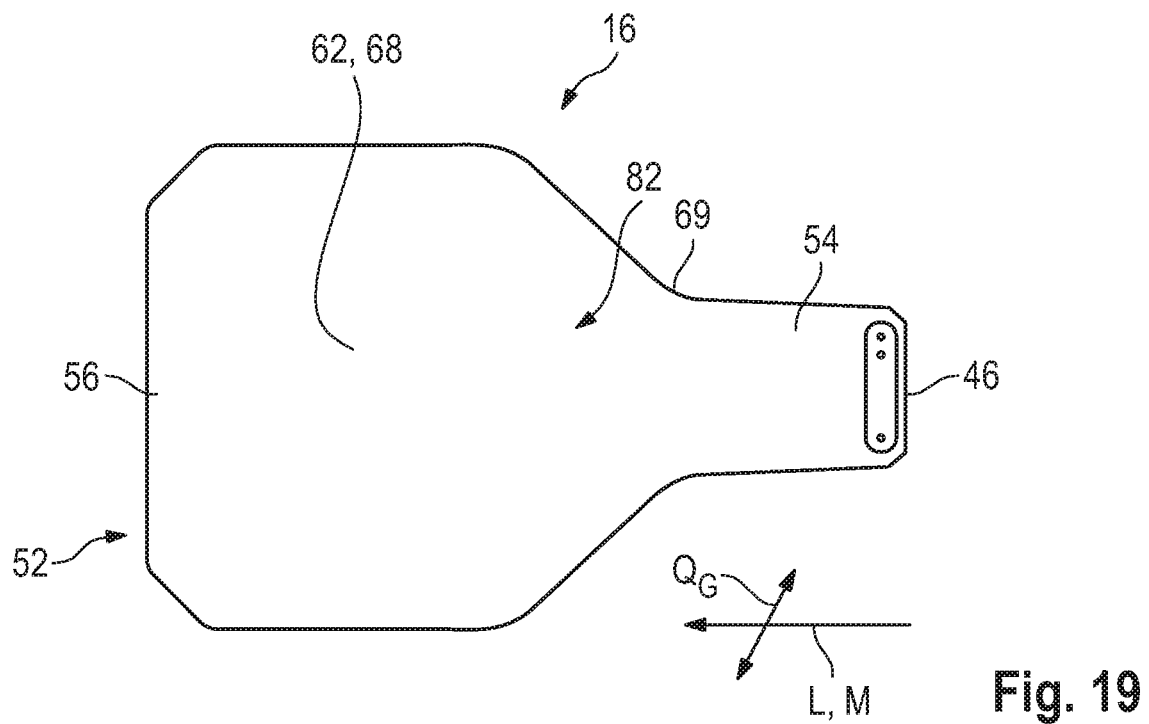
FIG. 19 shows the airbag of the vehicle occupant restraint system of FIG. 1 when being flatly spread in the non-inflated state in a top view onto a third outer wall portion of the airbag.
Figure 20:
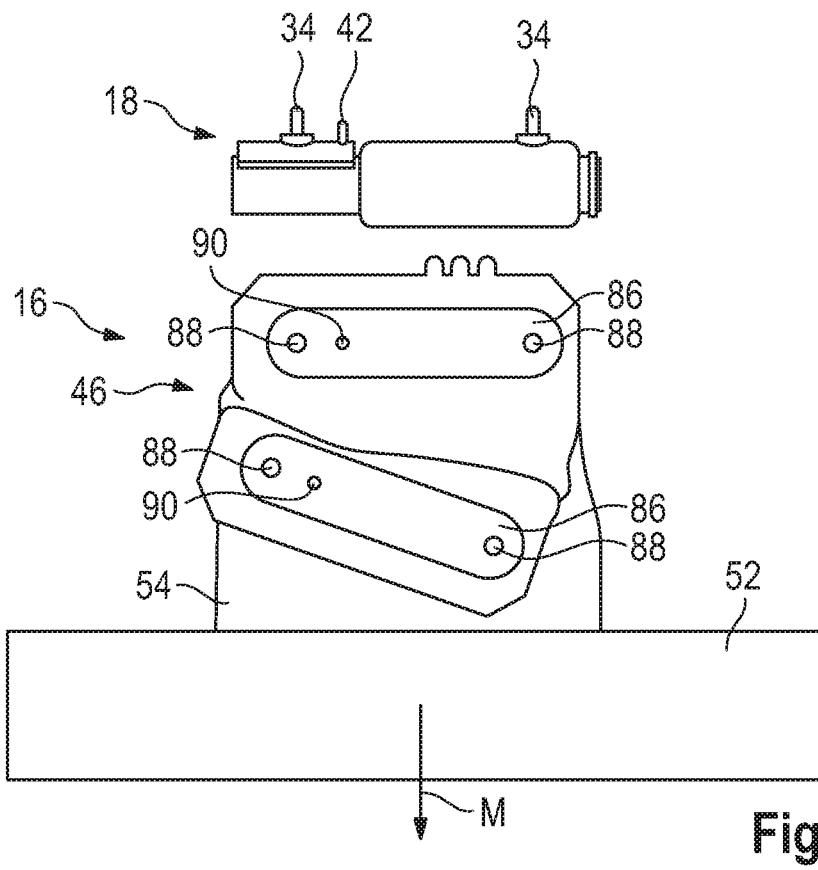
FIGS. 20 to 23 show a schematic representation of the insertion of an inflator into an inflation end of the airbag of the vehicle occupant restraint system of FIG. 1.
Figure 21:
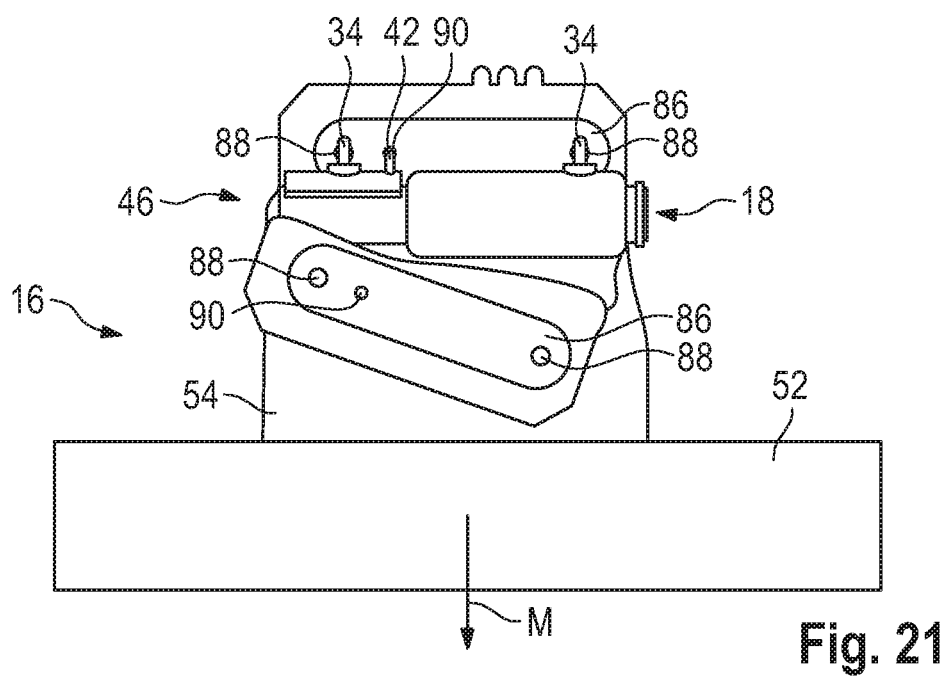

In the connecting portion 50 a neck 54 of the airbag 16 formed between the inflation end 46 and the restraint part 52 is folded (cf. also FIG. 19). In this example, the length of the neck 54 is approx. 5 to 40 cm, wherein those skilled in the art may easily adapt the exact length to the circumstances within the vehicle, e.g. the length of the passage and the position of the baffle of the airbag 16 in the inflated state.

In the transverse direction $Q_G$ of the airbag 16 normal to the longitudinal direction L thereof (cf. e.g. FIG. 19) and, resp., to the longitudinal module direction M, the neck 54 is definitely narrower than the restraint part 52. For example, the width of the neck 54 amounts to about 25-50% of the maximum width of the flatly spread restraint part 52. Thus, the filling volume of the neck 54 is definitely smaller than that of the restraint part 52.

The neck 54 in this embodiment does not contribute to the restraining effect as it acts high above in the vehicle directly on the roof liner. By decreasing the volume of the neck 54 by reducing its width, thus material, filling gas and space can be saved in the airbag module 12.

Figure 36:
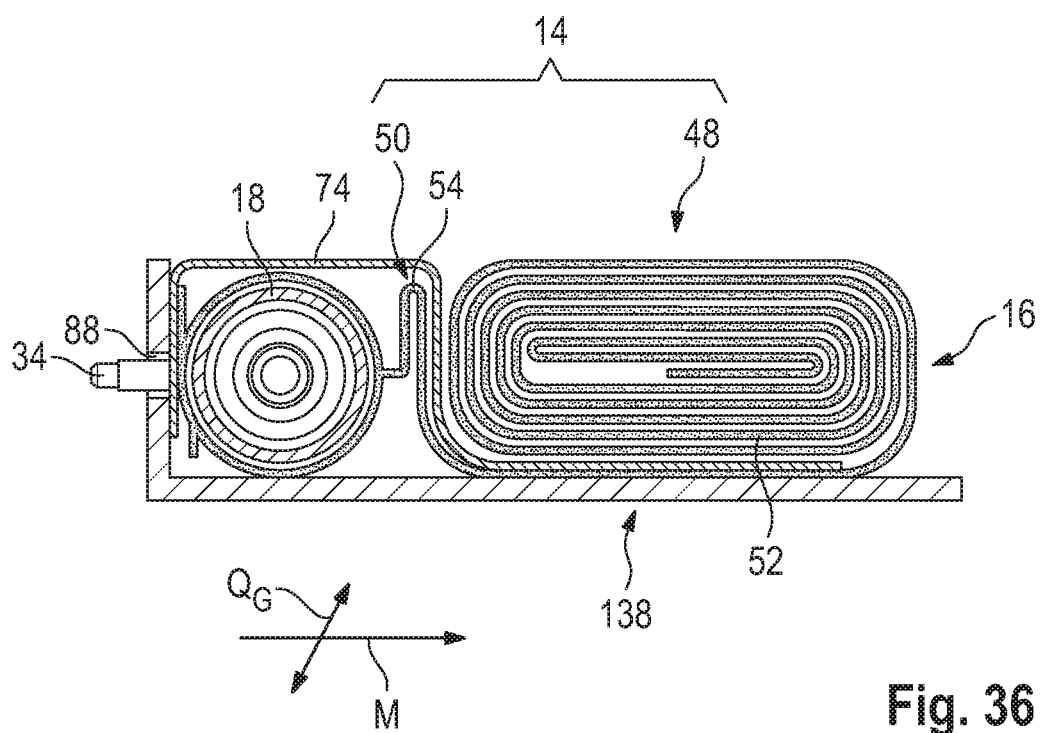
FIG. 36 shows the airbag package in a schematic sectional view being inserted in a folding device.

The connecting portion 50 and the main package 48 constitute two portions of the airbag package 14 folded separately from each other, as is evident from FIG. 36, for example.

Whereas the main package 48 is folded and rolled, for example, as will be illustrated later, the connecting portion 50 in this case is merely folded in zigzag folding having one to three folds in this example. The folds are located strung in series in the longitudinal module direction M in this case.

In the longitudinal module direction M, the inflator 18, the connecting portion 50 and the main package 48 are located linearly in series.

This arrangement causes filling gas to flow from the inflator 18 initially into the neck 54 folded in the connecting portion 50. Due to the mere zigzag folding, the folds are filling one by one, which results in the fact that the connecting portion 50 will stretch and thus will exert a force acting in the longitudinal module direction M on the still folded main package 48.

Figure 11:
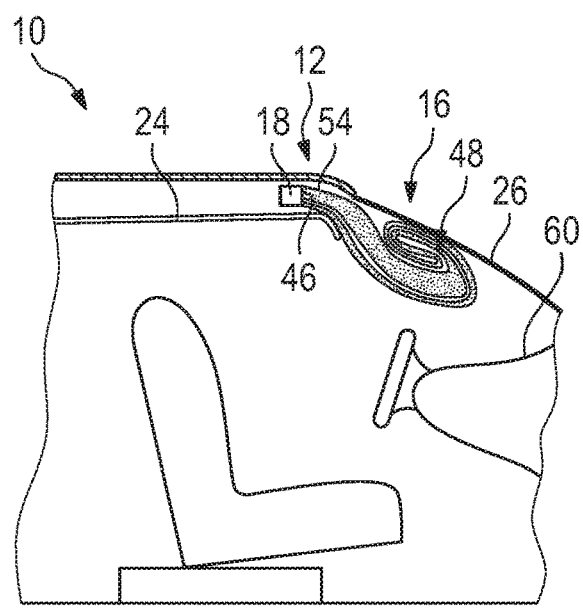
Figure 11:
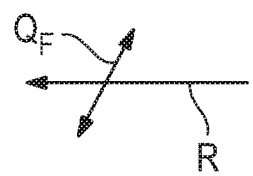
Figure 12:
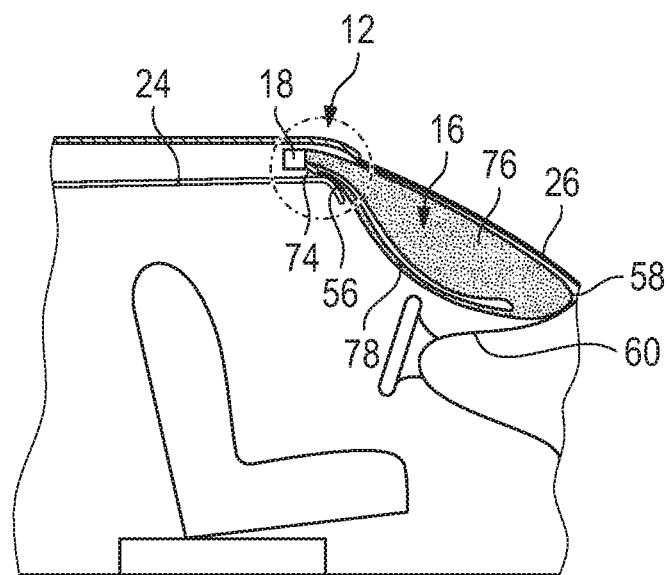
Figure 13:
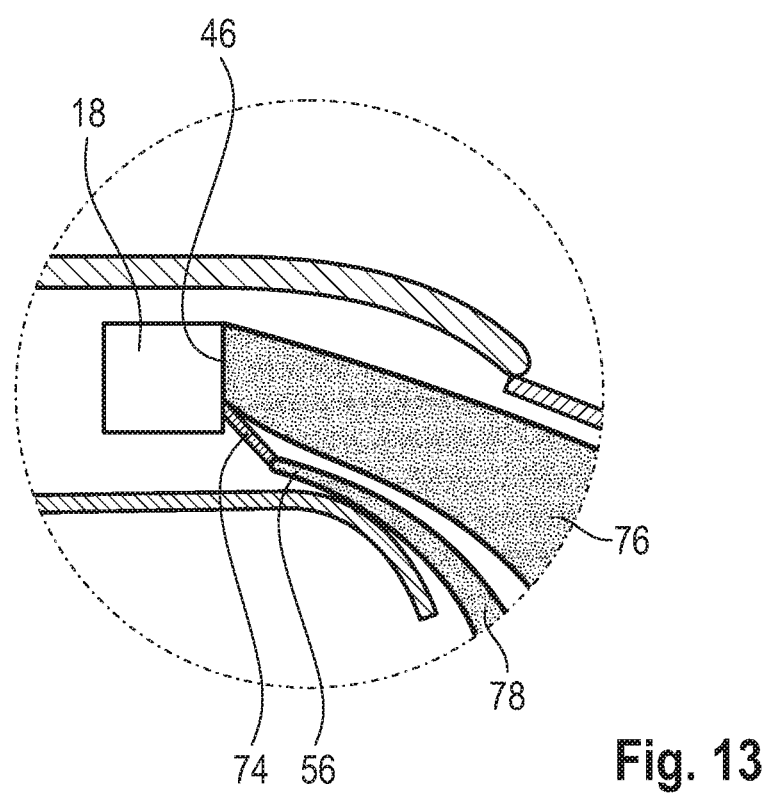

As a result, the main package 48 presses the roof liner 24 open and is pushed into the vehicle interior while still being substantially folded. This situation is schematically shown in FIG. 11.

At this point in time, substantially no gas flows into the main package 48, as the gas flow is blocked by the still existing folds of the connecting portion 50.

Although here this folding technique and the sliding of the main package 48 into the vehicle interior is described in connection with an airbag module 12 fastened to the roof, according to the invention this technique may be conferred upon airbag modules that are used at other locations within the vehicle, such as in the knee area or in a backrest.

In the side view, the completely inflated airbag 16 approximately takes a Y-shape or T-shape (see FIG. 17), with the stem of the Y or T being formed by the inflation end 46 and the neck 54. The restraint part 52 comprises a first free end 56 as well as a second free end 58. This is evident for the inflated airbag 16 in FIG. 17 and for the non-inflated flatly spread airbag 16 e.g. in FIG. 18 which illustrates the non-inflated airbag 16 in a lateral sectional view, wherein the usually flatly superimposed layers are shown to be somewhat pulled apart for reasons of clarity.

In the fully inflated state, the second free end 58 is located in a transition between the windshield 26 and an instrument panel 60 of the vehicle, while the first free end 56 extends in the direction of the vehicle occupant and forms a lower end of the overall airbag 16 as well as of a baffle 62 for absorbing the vehicle occupant.

Figure 18:
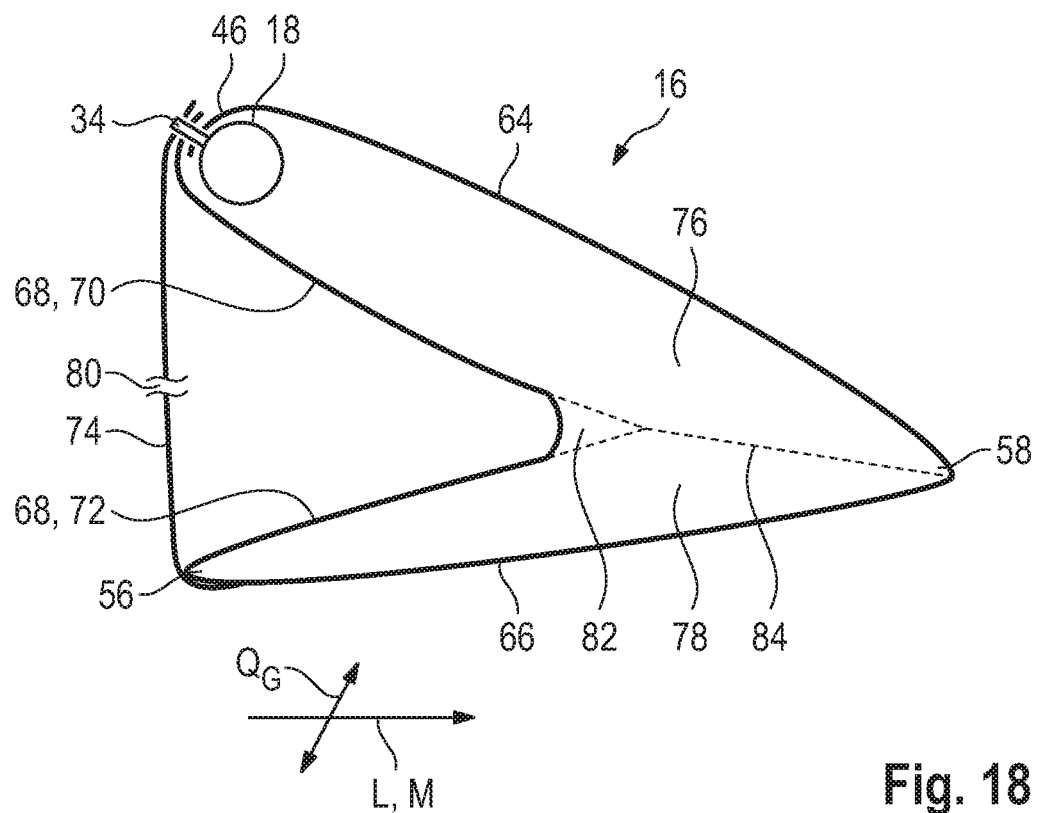
FIG. 18 shows a schematic sectional view of the airbag of the vehicle occupant restraint system of FIG. 1 with the inflator being inserted.

The airbag 16 substantially includes three large outer wall portions 64, 66, 68 (see FIG. 18). A first outer wall portion 64 extends from the inflation end 46 to the second free end 58 and in the inflated state forms a bearing surface for the airbag 16 on the windshield 26. A second outer wall portion 66 extends from the second free end 58 to the first free end 56 and in the inflated state is located above the instrument panel 60. A third outer wall portion 68 extends from the first free end 56 to the inflation end 46 and in the inflated state of the airbag 16 forms the baffle 62 for the vehicle occupant.

In the third outer wall portion 68 the neck 54 is transformed into the restraint part 52 via a shoulder 69 which is beveled on both sides so that a continuous transition is formed from the neck 54 into the baffle 62 (cf. FIG. 19).

In the folded main package 48, however, the first free end 56 is folded back toward the inflation end 46 so that portions 70, 72 of the third outer wall portion 68 are folded back onto themselves. Accordingly, initially the free end 56 is connected to the inflation end 46 by a tether 74. This is shown in detail in FIGS. 12, 13 and 18.

The tether 74 in this example is not fixed directly to the first free end 56 but is offset by about 5 to 20 cm on the second outer wall portion 66. This permits a more compact folding of the airbag package 14, as will be described below.

This fact as well as the folding of the main package 48 described later in detail ensure that at the time when the main package 48 arrives in the vehicle interior the first free end 56 is still withheld by the tether 74 in the roof area. The remainder of the main package 48 meanwhile continues to deploy in the vehicle interior, wherein the filling gas flowing into the airbag 16 at first inflates only a partial area of the airbag 16.

Figure 14:
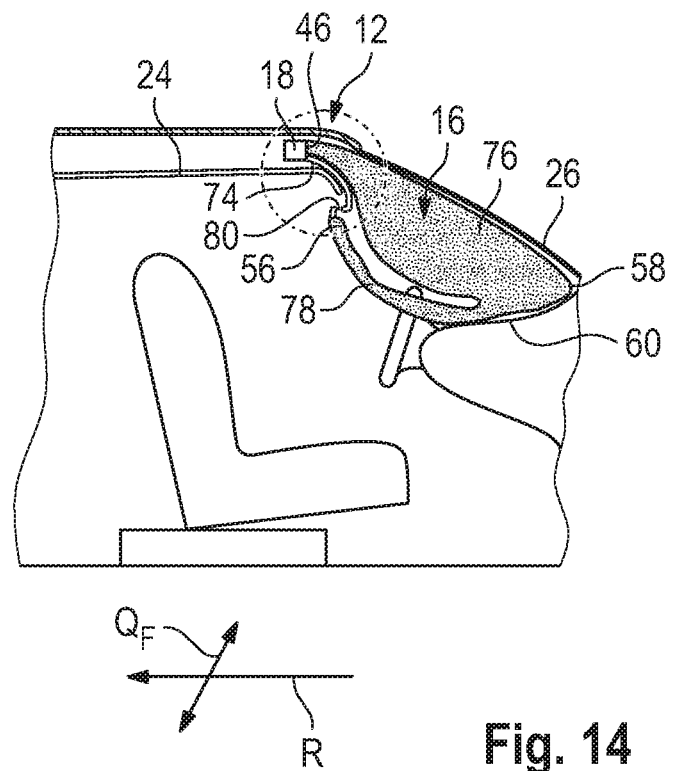
Figure 15:
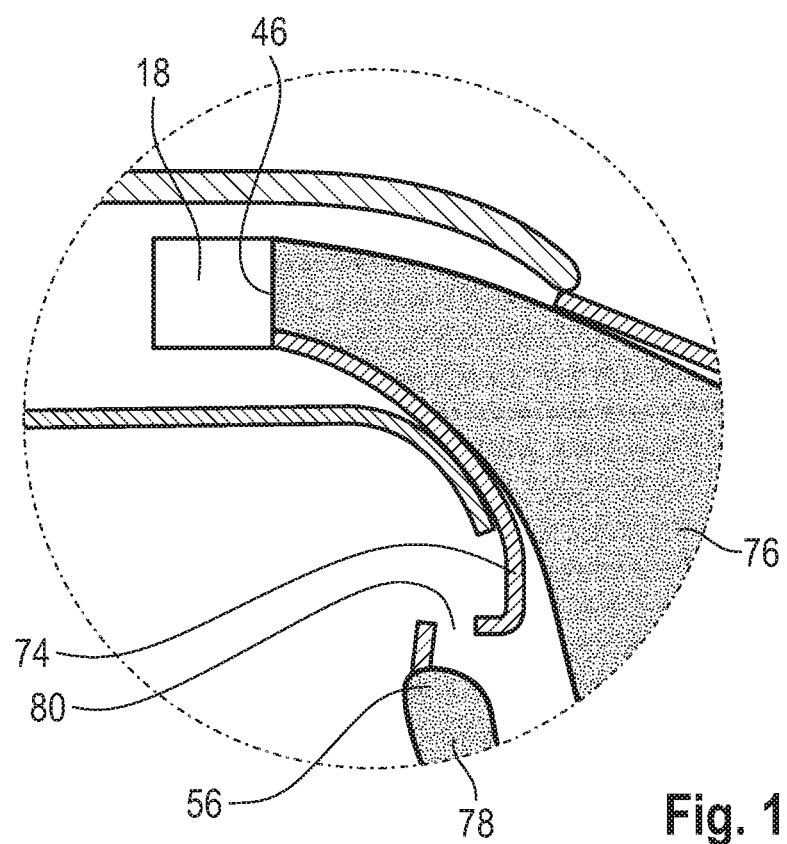

It is evident from FIGS. 14 and 18 that at this point in time, when the first free end 56 is still connected to the inflation end 46 via the tether 74, the airbag 16 takes approximately a U-shape having an inner leg 76 and an outer leg 78.

The inner leg 76 of the U is delimited toward the windshield 26 by the first outer wall portion 64 of the airbag 16. Toward the passenger compartment, the inner leg 76 is delimited by an upper portion 70 of the third outer wall portion 68.

The outer leg 78 is delimited toward the instrument panel 60 by the second outer wall portion 66. Toward the vehicle interior, the outer leg 78 is delimited by a lower portion 72 of the third outer wall portion 68.

The two portions 70, 72 of the third outer wall portion 68 are initially held together by the tether 74. In this way, filling gas flows only into the inner leg 76, while the outer leg 78 still remains substantially unfilled, although the airbag package 14 already has largely deployed. This situation is illustrated in FIGS. 12 to 15.

When a particular tensile force which is accompanied by a predetermined filling volume of the airbag 16 is exceeded, the tether 74 becomes detached after a first period of time following activation of the inflator 18. In this example, for this purpose a weakened zone 80 is formed on the surface of the tether 74 (see FIG. 18).

Figure 16:
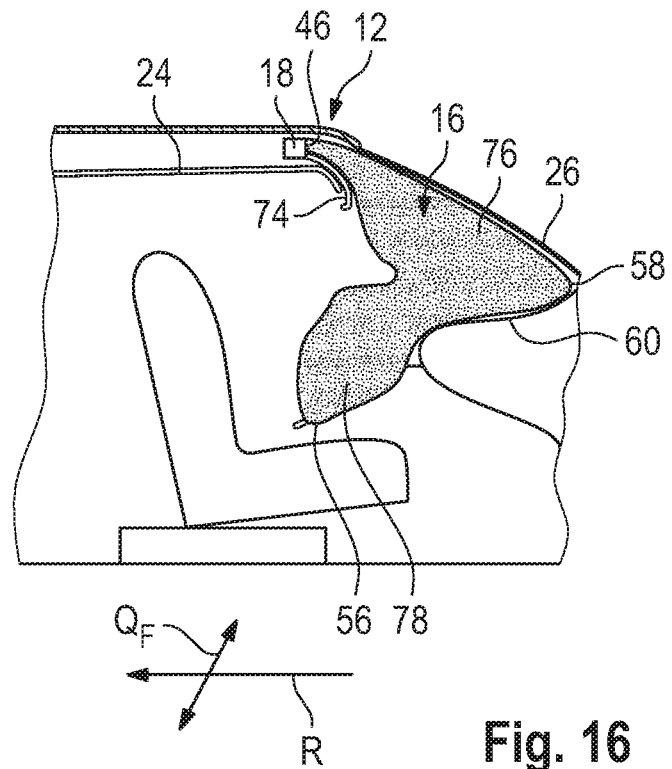

At the time when the tether 74 becomes detached, the neck 54 is already fully inflated in this example (see FIG. 16).

Figure 17:
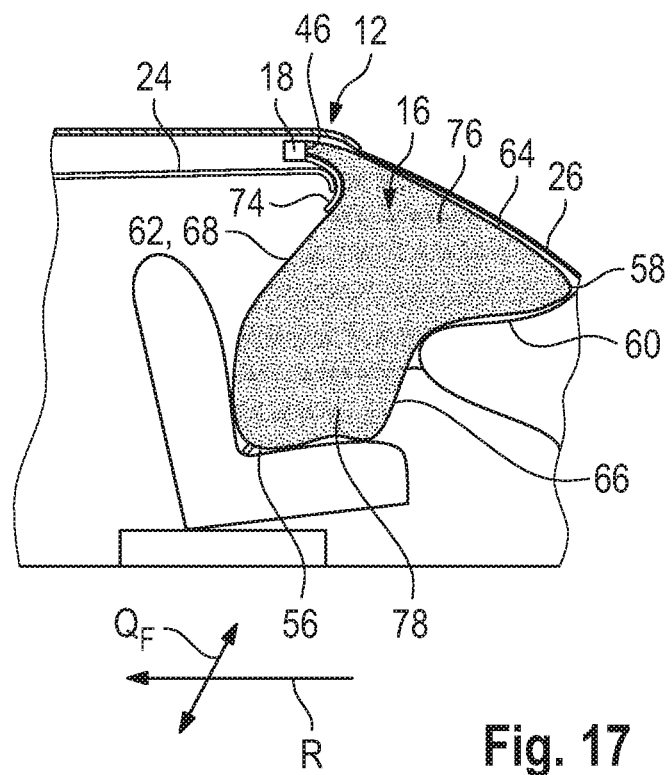

In a second period following the first period, the airbag 16 is completely filled after the tether 74 has split into two parts at the weakened zone 80. The completely inflated state is shown in FIG. 17.

In the fully inflated state, the airbag 16 takes approximately a Y-shape or a T-shape, when viewed from the side, as the inner leg 78 has folded downwards in the vehicle interior. The arms of the Y then are formed by two inflated portions of the restraint part 52 each of which extends from the first and second free ends 56, 58 toward the inflation end 46 and both of which merge into the neck 54.

Moreover, in the third outer wall portion 68 a bag 82 inwardly reversed in the folded state (see FIG. 18) is formed which in the fully inflated airbag 16 bulges partly outwardly and thus enlarges the baffle 62. A lower end of the bag 82 is permanently connected to the second free end 58 via an inner tether 84, however, so as to stabilize the shape of the inflated airbag 16.

Preferably, before the airbag 16 is folded, the inflator 18 is fixed at the inflation end 46 in the airbag 16, as is shown in FIGS. 20 to 23. This step might also be taken after folding the airbag 16, however.

At the inflation end 46 the airbag 16 ends in two opposite tabs 86 each of which extends over the entire width of the neck 54. Each of the tabs 86 includes two fastening holes 88 as well as a positioning hole 90 corresponding, as to their arrangement, to the fastening bolts 34 and the positioning bolt 42 at the inflator 18 (see e.g. FIG. 20).

Inside the airbag 16 each of the two tabs 86 may be reinforced by one or more reinforcing layers which also may include a temperature-resistant and gastight coating, where necessary.

Figure 22:
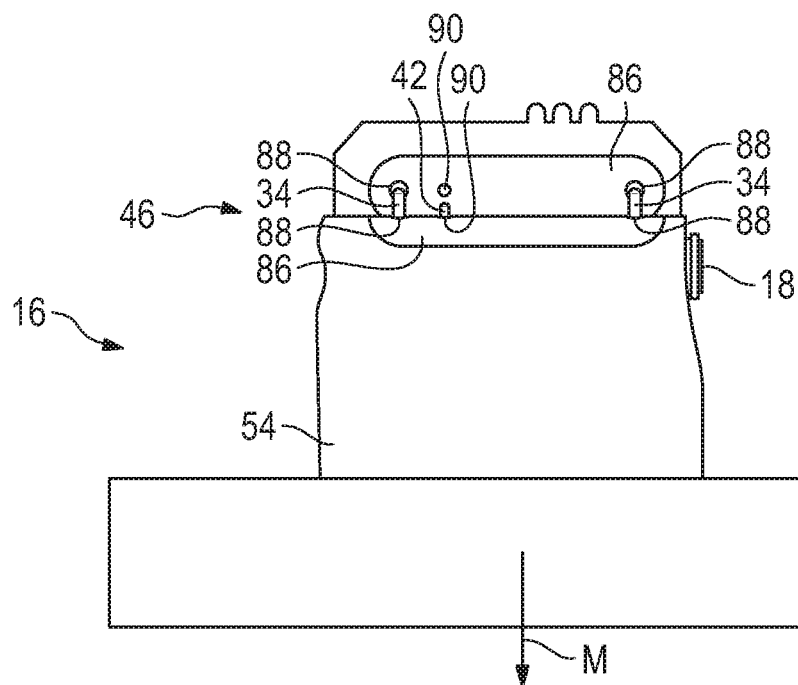
Figure 23:
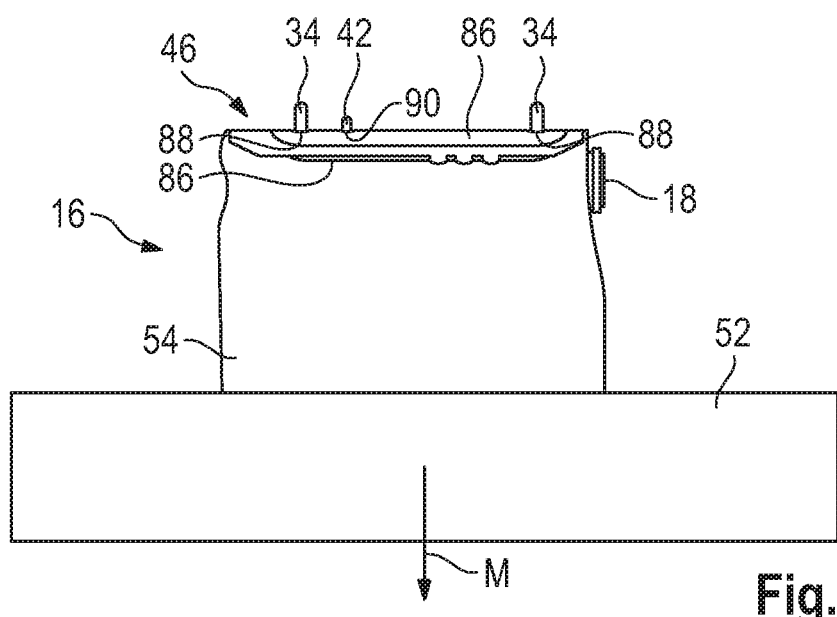

For assembly of the inflator 18, the latter is placed between the two tabs 86 (FIG. 21) and then the two tabs 86 are individually folded over the inflator 18, with each fastening hole 88 being pulled over the fastening bolts 34 and the positioning hole 90 being pulled over the positioning bolt 42 (FIGS. 22 and 23).

Due to the wrapping by the two tabs 86 and possibly the coating provided on the inside of the tabs 86, the inflator-side inflation end 46 of the airbag 16 now is sufficiently sealed in a gastight manner.

The tabs 86 now are secured to the fastening bolts 34 by means of clamping washers and/or screw nuts (not shown).

Figure 24:
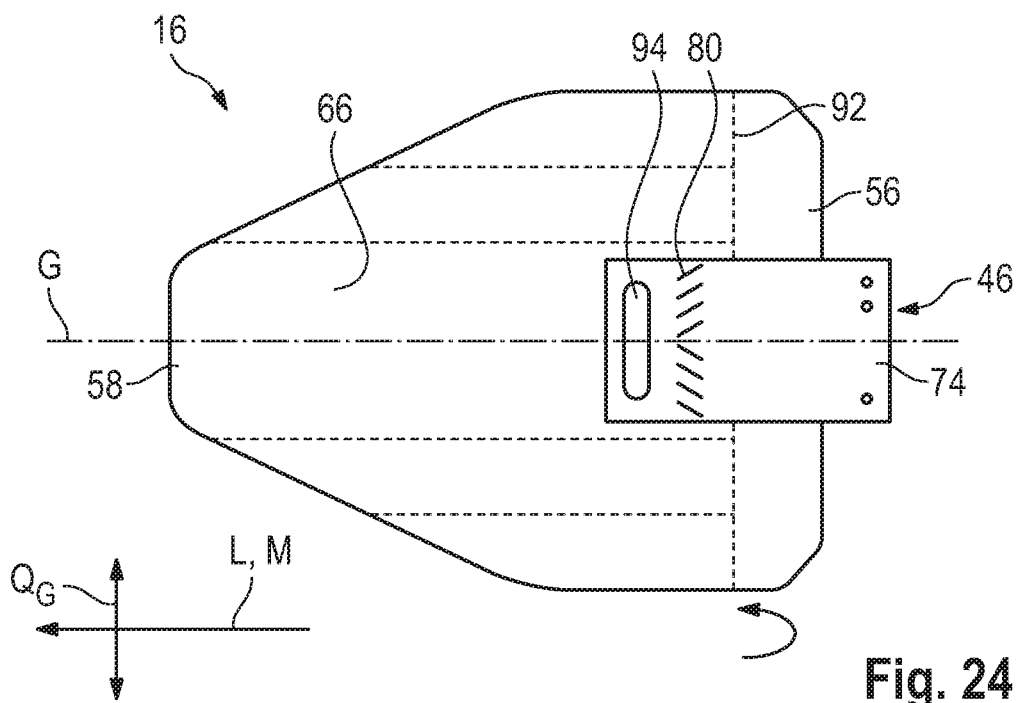
FIGS. 24 to 27 show steps of folding the airbag of the vehicle occupant restraint system of FIG. 1, when viewed in a top view.

For folding the airbag 16 into the airbag package 14, the airbag 16 at first is flatly spread as shown in FIG. 24, with the first end 56 being folded back to the inflation end 46.

Thus, in the area of the first free end 56 the two legs 76, 78 of the airbag 16 are superimposed. The third outer wall portion 68 is folded back onto itself in the portions 70, 72.

Each of the first outer wall portion 64 and the second outer wall portion 66, on the other hand, extends stretched from the second free end 58 to the inflation end 46.

The tether 74 is positioned so that its free end is located on the inflation end 46.

Figure 25:
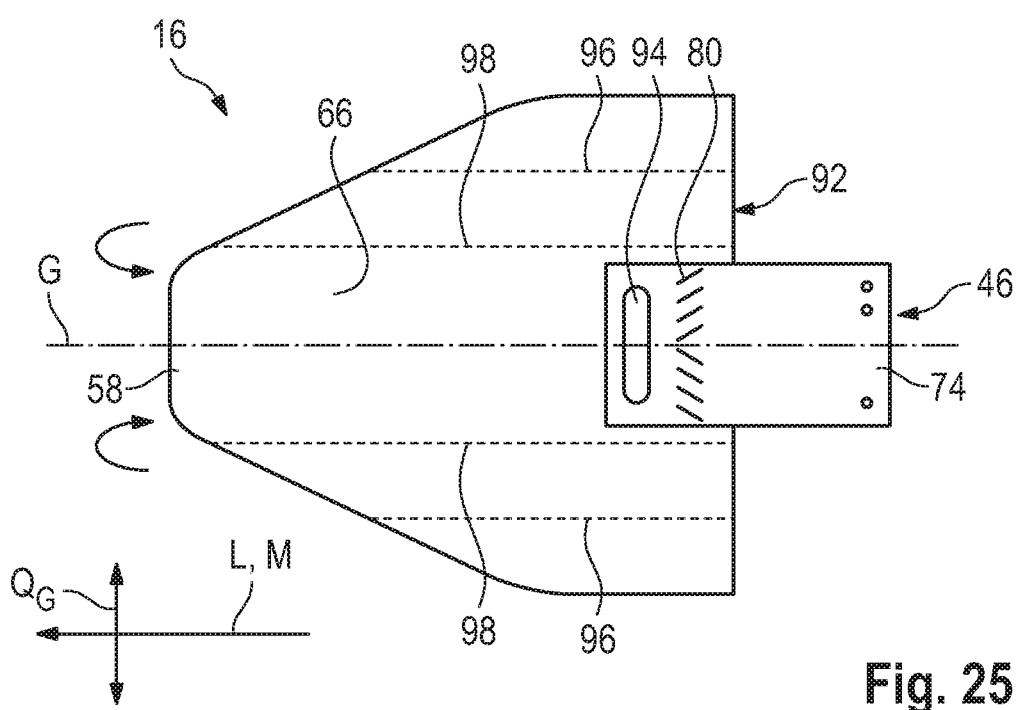

In a first folding step, the first free end 56 now is folded once about a folding line 92 located perpendicularly to the longitudinal airbag direction L (which in the flatly spread airbag 16 coincides with the longitudinal module direction M) but not over an attachment point 94 of the tether 74 on the second outer wall portion 66 (see FIGS. 24 and 25). Depending on the shape of the airbag, this folding step might be omitted as well.

Figure 26:
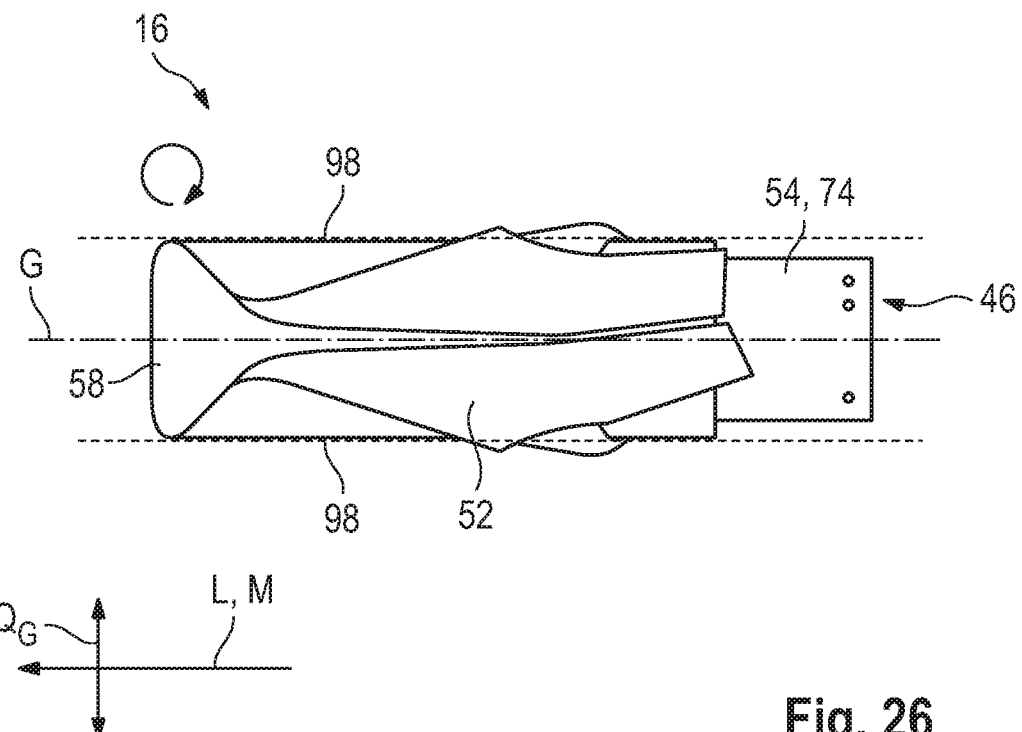

Now in a second folding step, the two lateral areas of the airbag 16 are folded inwardly in a zigzag fold along folding lines 96, 98 extending in parallel to the longitudinal airbag direction L. This is shown in FIGS. 25 and 26. The two folding lines 98 now delimit the airbag 16 laterally outwardly in the transverse direction $Q_G$.

The distance of the folding lines 96, 98 from each other and from a peripheral edge of the airbag 16 is selected so that in the center of the airbag no overlapping of the lateral areas of the airbag 16 will occur, wherein the center of the airbag 16 is defined by an imaginary center line G extending from the inflation end 46 to the second free end 58 and being arranged symmetrically to the inflation end 46.

In the spread state, the airbag 16 may be symmetrical with respect to said center line G, however this is not imperative but is determined, inter alia, by the geometry of the passenger compartment, the windshield 26 and the instrument panel 60.

Figure 27:
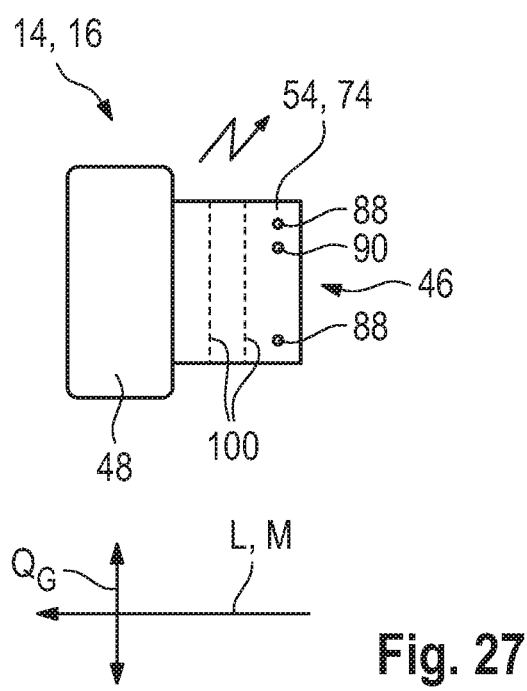

The partially folded airbag 16 shown in FIG. 26 now is rolled up in a rolling step starting from the second free end 58, for example in three to ten turns, especially in six turns, toward the inflation end 46. The result of this folding step is illustrated in FIG. 27. The rolled-up area now forms the main package 48. The airbag 16 is rolled up only to the end of the restraint part 52 of the airbag 16. The areas of the neck 54 and of the tether 74 projecting therefrom in the direction of the inflation end 46 (see FIGS. 26 and 27) remain unaffected by this folding step.

In another folding step, the area of the neck 54 as well as possibly of the tether 74 projecting from the main package 48 is folded into a mere zigzag folding having about one to three folds, with the folding lines 100 being aligned perpendicularly to the module direction M and thus in parallel to a longitudinal axis of the inflator 18 (not shown here). Now the folded airbag package 14 takes the shape shown in FIGS. 27 and 36.

The same hole structure 88, 90 as at the tabs 86 of the airbag 16 is realized also at the free end of the tether 74, and the tether 74, too, is pulled over the fastening bolts 34 and the positioning bolt 42 with the fastening holes 88 and the positioning hole 90 (see also FIG. 36). The two tabs 86 and the tether 74 now are superimposed in three layers, with the fastening bolts 34 of the inflator 18 passing through all three aligned fastening holes 88. This applies mutatis mutandis to positioning holes 90.

In the mounted state, the airbag 16 is connected to the module carrier 22 in a load-bearing manner via the fastening bolts 34. The tensile forces acting on the tether 74 are also transmitted to the module carrier 22 via the fastening bolts 34.

Figure 28:
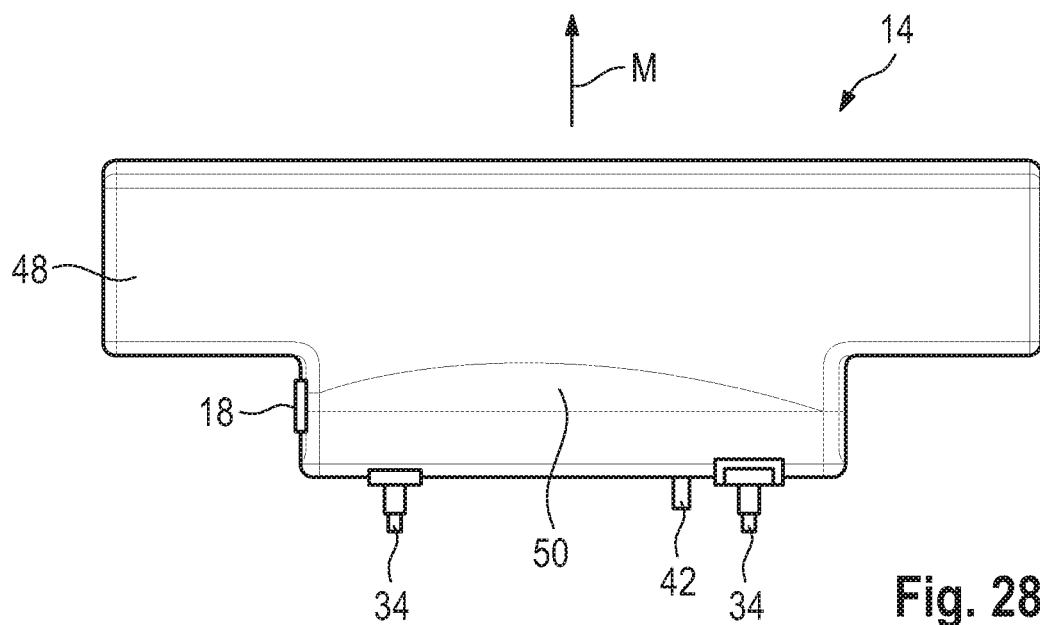
FIG. 28 shows a schematic representation of the folded airbag package of the vehicle occupant restraint system of FIG. 1.

After inserting the inflator 18 and folding the airbag 16, the airbag package 14 takes the shape as shown in FIG. 28.

After fixing the inflator 18 in the airbag 16 and folding the airbag 16 into the airbag package 14, the airbag package 14 is inserted along with the inflator 18 into the wrapping 20.

The FIGS. 29 to 35 illustrate the wrapping 20 in detail.

Figure 30:
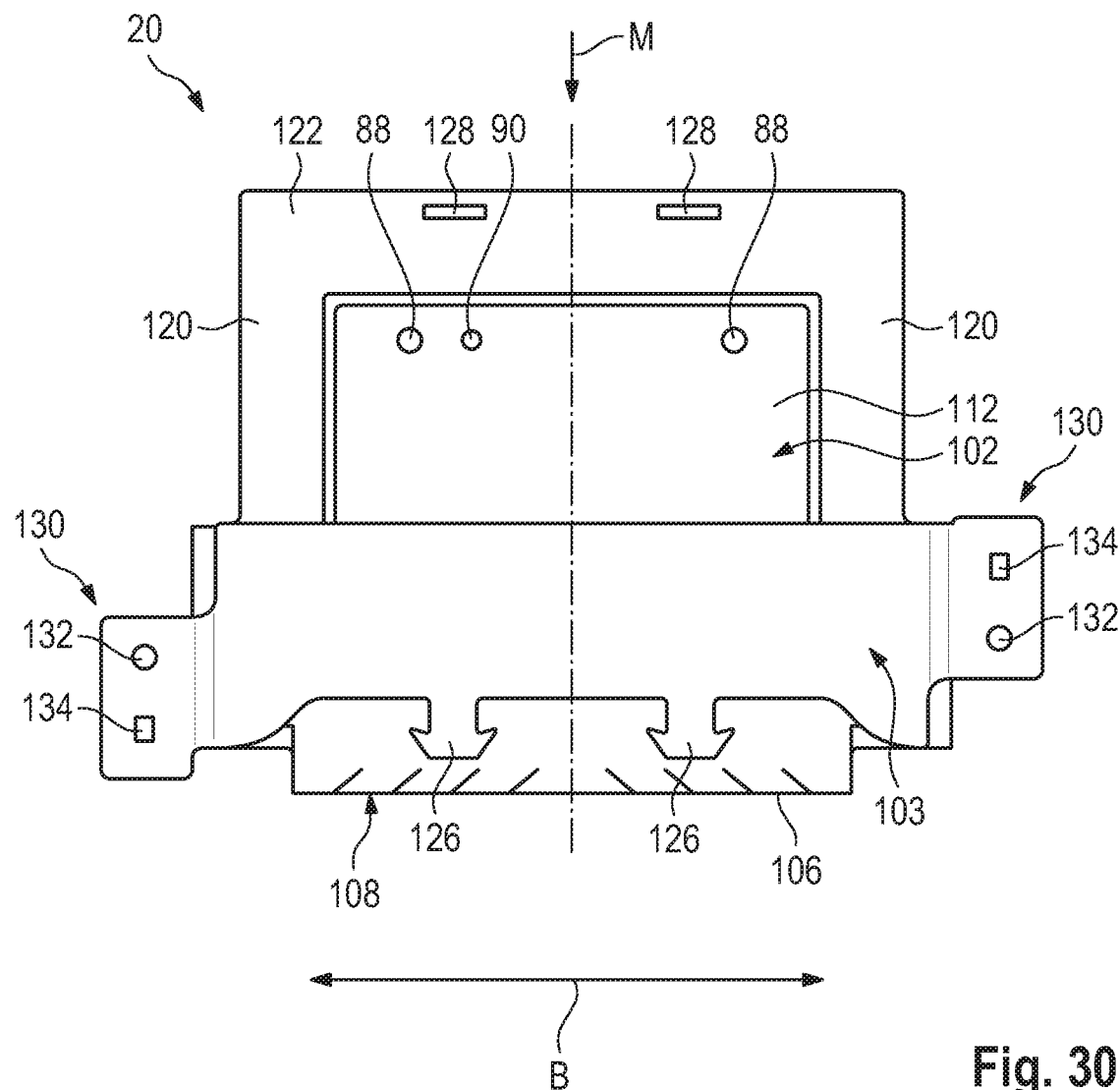
FIG. 30 shows a schematic top view onto the wrapping of FIG. 29.

In this example, the wrapping 20 consists completely (except for possible seams, of course) of airbag fabric and is composed of exactly two cut parts 102, 103 (see FIG. 30).

The wrapping 20 includes a holding bag 104 (see FIG. 31) that is formed by two folded portions of the first cut part 102 and serves for holding the main package 48 of the airbag package 14. A bottom 106 of the holding bag 104 is provided with a weakened zone 108 (see FIG. 30, for example) and extends in a direction B normal to the module direction M.

Each of the two edges 110 (cf. FIG. 31) of the holding bag 104 facing away from the bottom 106 in one piece and seamlessly merges into a retaining tab 112. The two retaining tabs 112 form an inflator fixation 114 for fixing the inflator 18 in the wrapping 20 and, at each of their free ends, include a hole pattern corresponding to the arrangement of the fastening bolts 34 and the positioning bolt 42. Accordingly, at the free edge of each retaining tab 112 two fastening holes 88 as well as one positioning hole 90 are provided.

The holding bag 104 and the retaining tabs 112 are jointly realized in the first cut part 102 by the first cut part 102 being folded back onto itself and the longitudinal edges adjacent to the folding line being connected in portions so as to form the holding bag 104. The free portions exceeding the holding bag 104 then form the retaining tabs 112 (cf. e.g. FIGS. 30 and 31).

Figure 31:
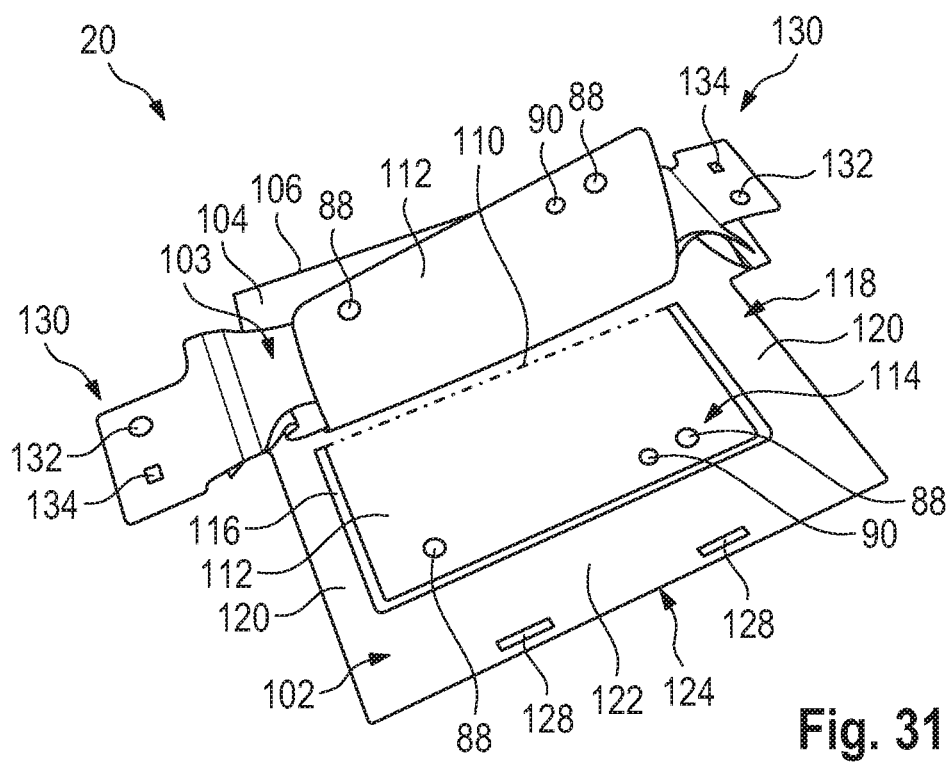
FIG. 31 shows a schematic perspective representation of the wrapping.

One of the retaining tabs 112, in FIG. 31 the flatly spread lower retaining tab 112, is separated by a U-shaped intersecting line 116 from a surrounding remainder of the first cut part 102. The intersecting line 116 forms a bracket 118 having two belt portions 120 located on the side of the retaining tab 112 as well as a web 122 connecting the two belt portions 120. The belt portions 120 merge into the holding bag 104 in one piece at their end opposite to the web 122.

The bracket 118 is part of an airbag package fixation 124. In addition, the latter includes at least one pair of first and second fixing elements 126, 128 adapted to be nested and thus to be fixed to each other. In this case, two pairs of fixing elements 126, 128 are provided which are juxtaposed in parallel to the direction B of the bottom 106. The exact position and number of fixing elements as well as the formation thereof are at a skilled person's discretion, of course.

In this example, the first fixing elements 126 are formed at the second cut part 103 extending in parallel to the direction of the bottom B over the holding bag 104. The first fixing elements 126 in this example take the shape of arrow-type hooks (cf. especially FIGS. 30 and 35) which are formed at an edge of the second cut part 103 facing the bottom 106.

Figure 35:
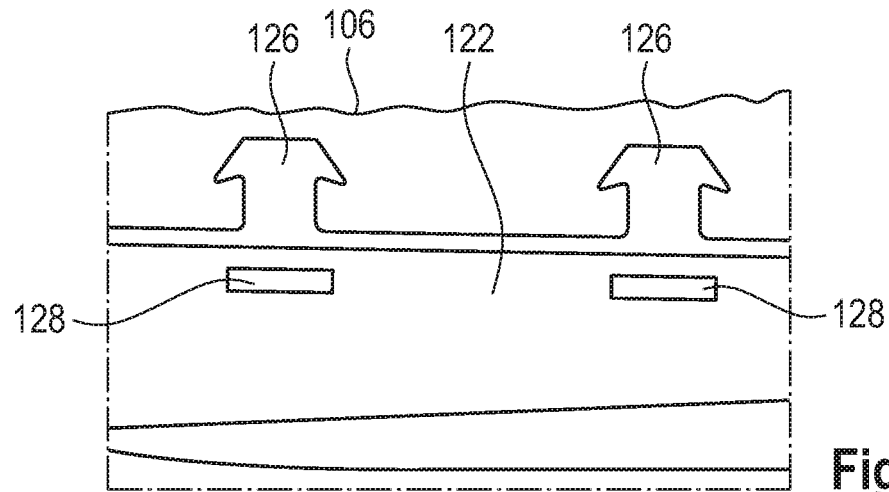
FIG. 35 shows details of the airbag package fixation of the wrapping.

Each of the two second fixing elements 128 is configured in the web 122 and here is formed by an elongate opening each through which the hook of the first fixing element 126 can be inserted so that the hook edges engage behind the edge of the opening and fix the first fixing element 126 to the web 122. FIG. 35 shows a detailed view of the fixing elements 126, 128.

The second cut part 103 in this embodiment is made from multi-layer airbag fabric, whereas the first cut part 102 is cut out of a single-layer airbag fabric. Cutting is performed by laser-cutting in this case, thus causing in the second cut part 103 the edges of the plural layers to be welded directly to each other without any further fixation of the edges to each other being required. Since, in this way, also the first fixing elements 126 are made from multi-layer airbag fabric, they have sufficient stiffness so as to get caught in the openings of the second fixing elements 128.

The second cut part 103 extends beyond the holding bag 104 laterally, viz. in parallel to the bottom direction B. At each of its free ends, a fixing portion 130 which serves for fastening the wrapping 20 tightly to the vehicle is formed. Said fastening need not bear the complete load of the deploying airbag 16, but primarily serves for positioning the airbag module 12 on the roof rail 23.

However, here the fixing portions 130 are also used for prefixing the airbag module 10 in the vehicle. For this purpose, each of the fixing portions 130 includes, apart from a fastening hole 132 through which e.g. a screw for vehicle-tight fastening is inserted, a further prefixing hole 134 in which a fastening clip 136 is inserted (see FIG. 34). When assembling the airbag module 10 to the vehicle, the fastening clip 136 is pushed into an opening on the roof rail 23 or on the module carrier 22 and maintains the airbag module 10 in position until the final fastening is completed.

The fastening hole 132 and the prefixing hole 134 are arranged in the two fixing portions 130 each in parallel to the longitudinal module direction M on top of each other but in a different order (see e.g. FIG. 30).

Figure 32:
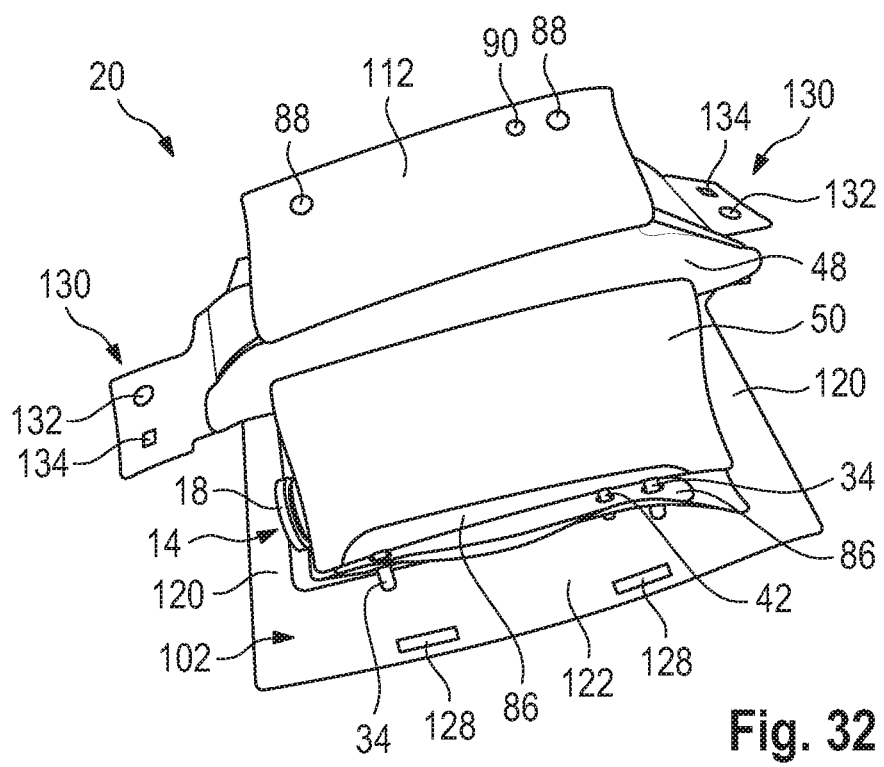
FIGS. 32 to 34 show the insertion of the airbag package into the wrapping.
Figure 33:
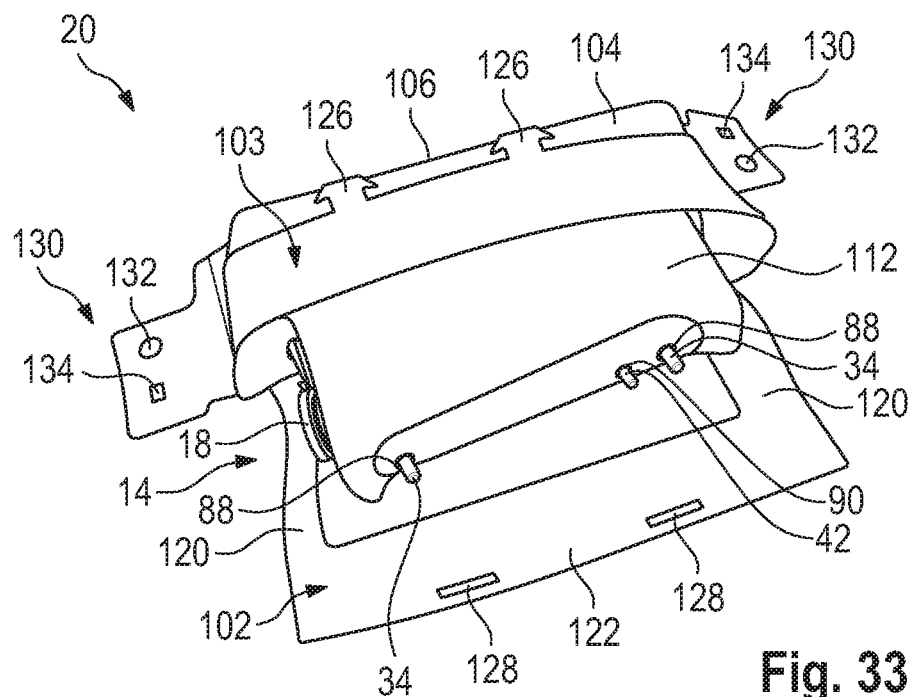
Figure 34:
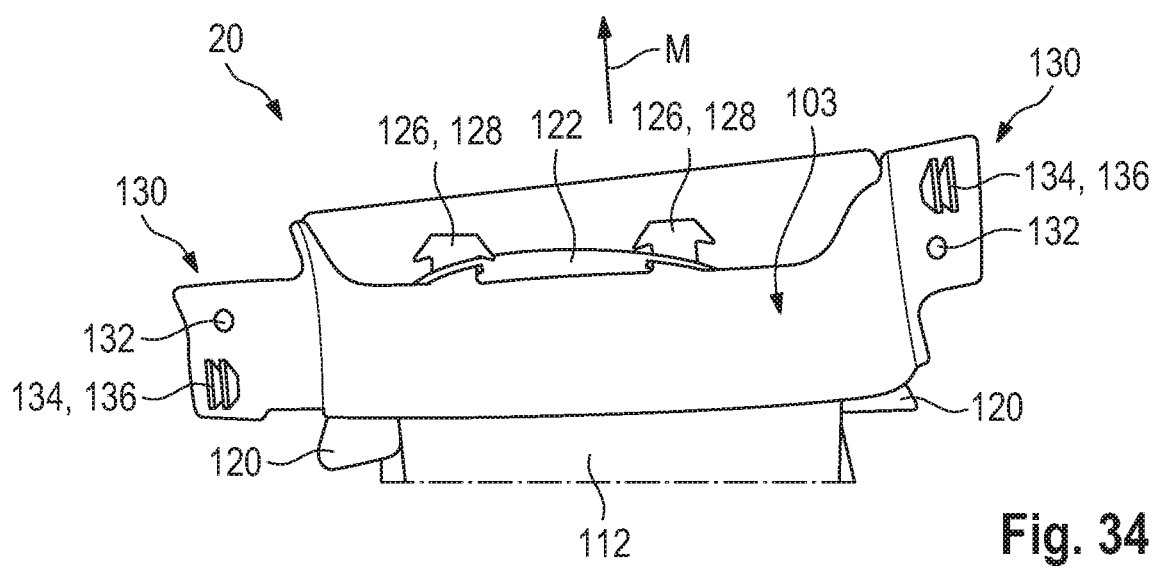

For inserting the airbag package 14 into the wrapping 20, initially the main package 48 is inserted into the holding bag 104 (see FIGS. 31 and 32). Then the two retaining tabs 112 are successively pulled with the fastening holes 88 and the positioning holes 90 over the fastening bolts 34 and the positioning bolt 42 of the inflator 18 so that they encompass the inflator 18 as well as naturally the inflation end 46 of the airbag 16 on the rear side of the inflator 18 (cf. FIGS. 32 and 33 as well as 37 and 38).

Figure 37:
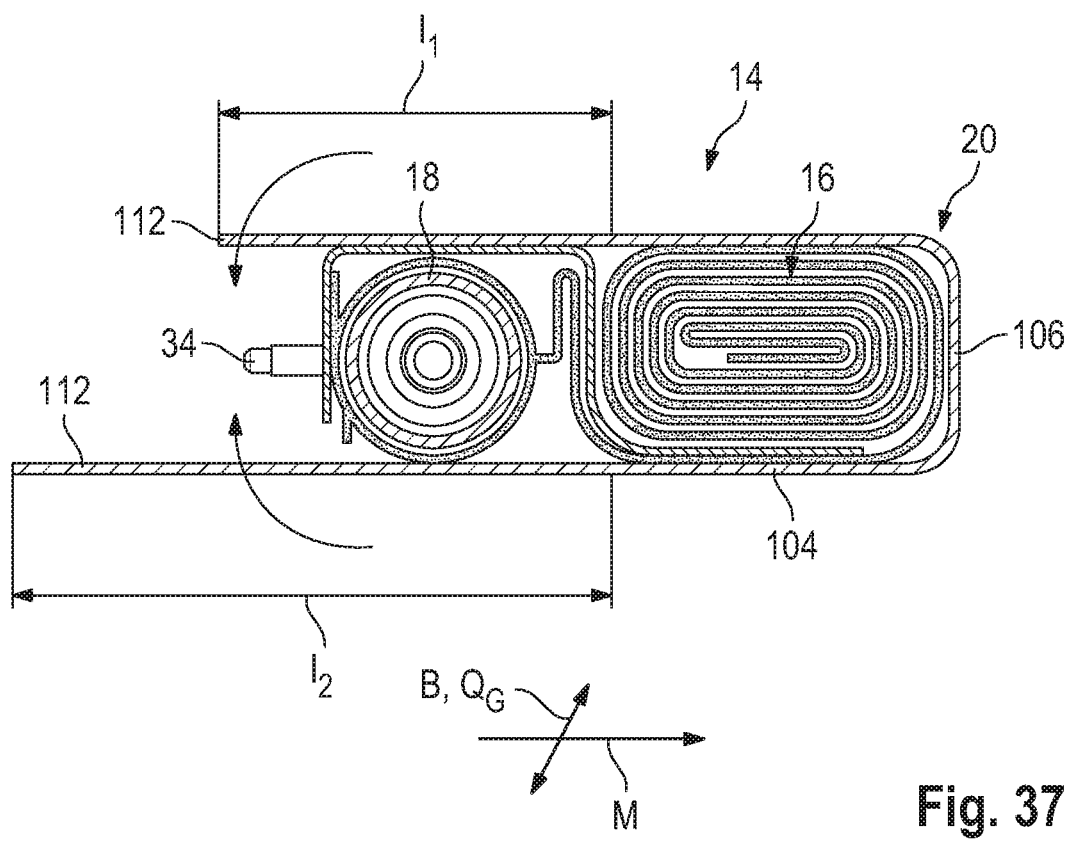
FIGS. 37 and 38 show the closing of an inflator fixation of the wrapping.
Figure 38:
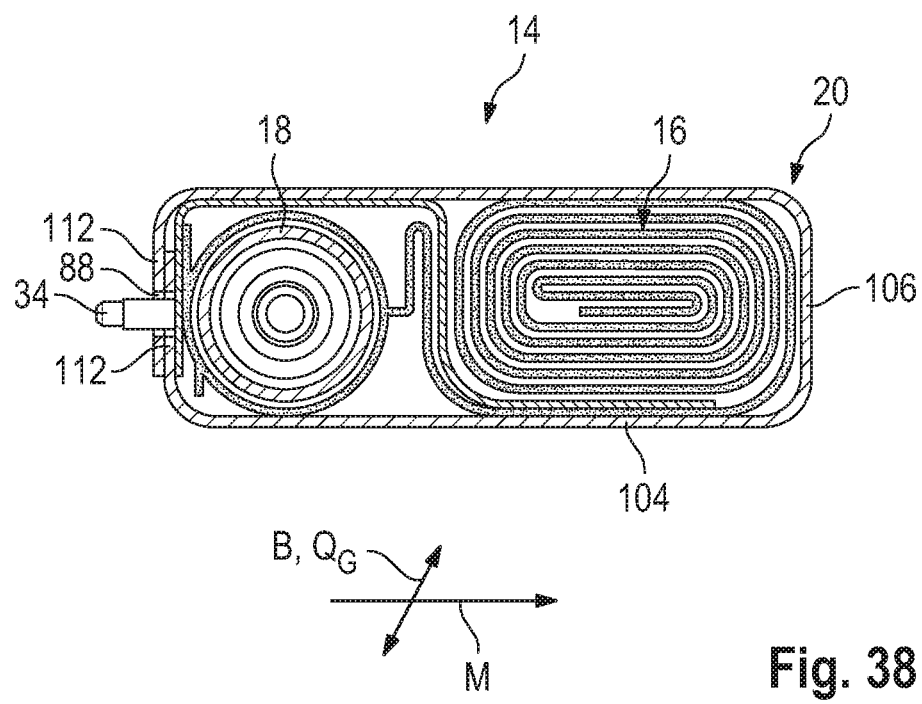

In the longitudinal module direction M, the two retaining tabs 112 may have different lengths $l_1, l_2$ as shown in FIG. 37, for example. In this way, the tensile forces acting via the retaining tabs 112 upon the fastening bolts 34 of the inflator 18 can be adjusted to a certain degree. As a result, the alignment of the inflator 18 with respect to rotation about the longitudinal axis thereof can be determined by selecting the length of the retaining tabs 112. Usually the fastening bolts 34 are desired to extend exactly in the longitudinal module direction M. However, it might also be advantageous, for example for facilitating the assembly on the roof rail, when the bolts 34 are tilted by few degrees vis-à-vis the longitudinal module direction M. Since the inflator 18 usually includes a flat gas outlet area (not shown), tilting by few degrees will not affect the gas outflow and the inflation behavior of the airbag 16.

Since the inflator fixation 114 is closed as described (shown in FIG. 33), now the bracket 118 is pulled over the retaining tabs 112. In the next step, the web 122 is slid through beneath the second cut part 103 and the hooks of the first fixing elements 126 are inserted through the openings of the second fixing elements 128 (see FIG. 34). The belt portions 120 are now located on the side of the retaining tabs 122 above the main package 48 of the airbag package 14 and safely retain the latter within the holding bag 104. Thus, the airbag package fixation 124 is closed.

The airbag package 14 including the wrapping 20 now can be inserted in the module carrier 22 so as to assemble the airbag module 10 to the vehicle.

When activating the airbag module 10, the weakened zone 108 opens at the bottom 106 of the holding bag 104 so as to let the airbag package 14 move out. The inflator fixation 114, the airbag package fixation 124 as well as the vehicle-tight fixation via the fixing portions 130 remain closed.

In order to better fix the zigzag folding of the neck 54 in the connecting portion 50 while the airbag package 14 is inserted into the wrapping 20, in an alternative process an intermediate cover 140 may be used, as illustrated in FIGS. 39 to 44.

Figure 39:
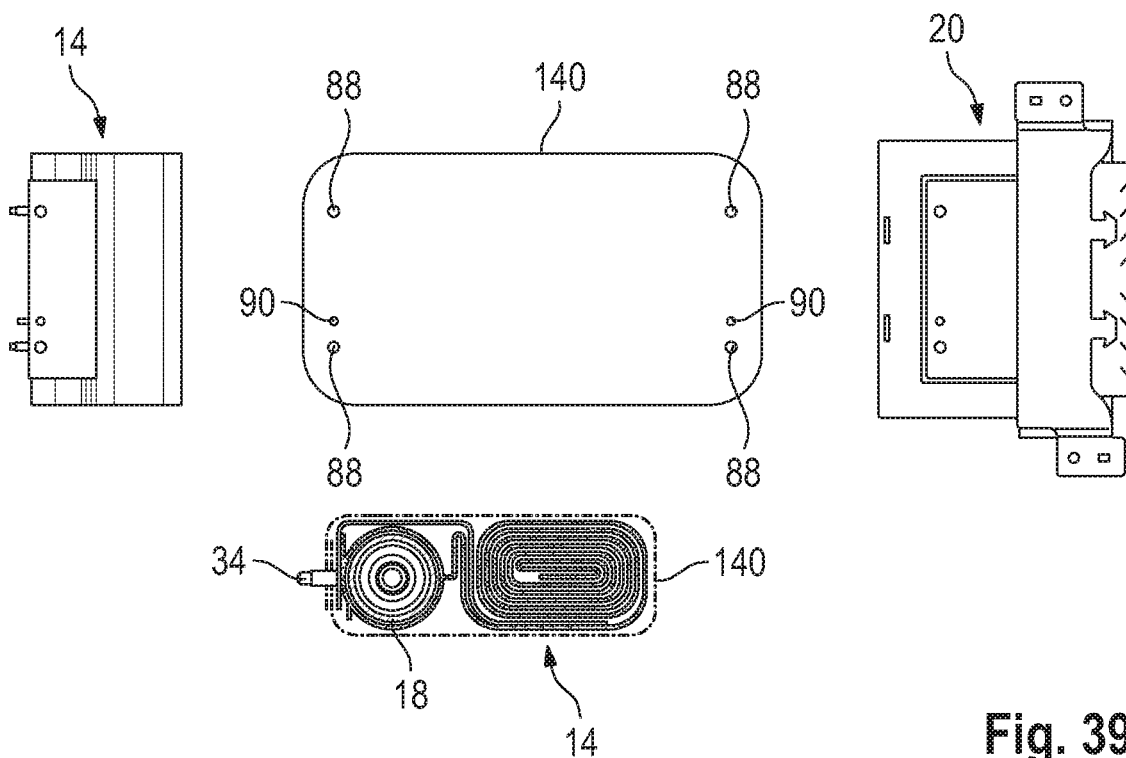
FIG. 39 shows a schematic overview of an alternative process for inserting the airbag package into the wrapping.

The intermediate cover 140 is a substantially rectangular piece of airbag fabric which at both free ends includes a hole pattern corresponding to the fastening bolts 34 and the positioning bolt 42 of the inflator 18 and having two fastening holes 88 and one positioning hole 90 (cf. FIG. 39).

Figure 40:
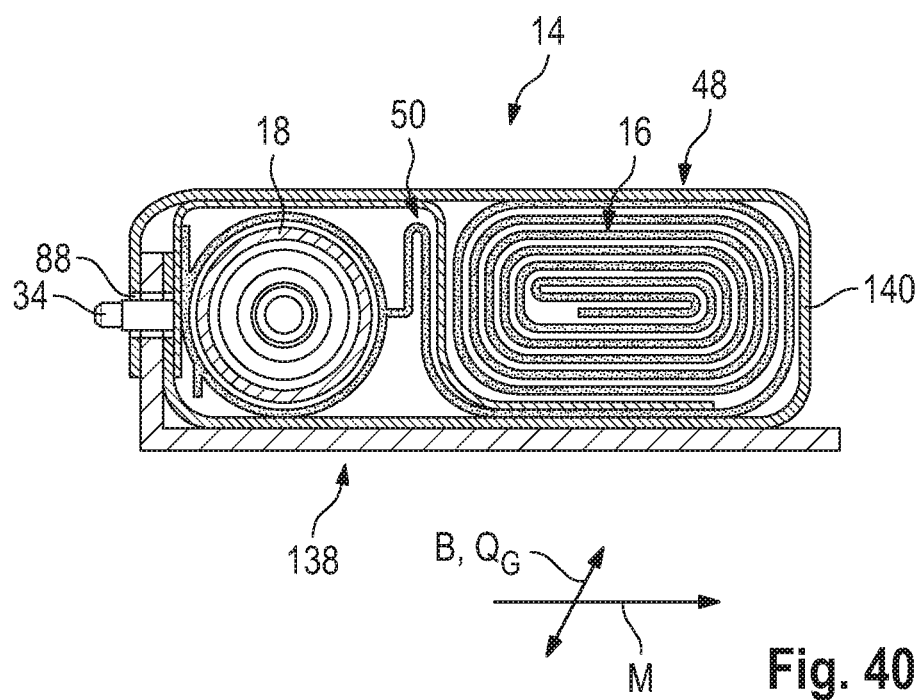
FIGS. 40 to 44 show steps of the alternative process for inserting the airbag package into the wrapping in a schematic representation.

The completely folded airbag package 14 including the inflator 18 is first wrapped into the intermediate cover 140, with both ends of the intermediate cover 140 being pulled over the bolts 34, 42 of the inflator 18. This is shown in FIG. 40, wherein use has been made of a known folding device 136.

Figure 41:
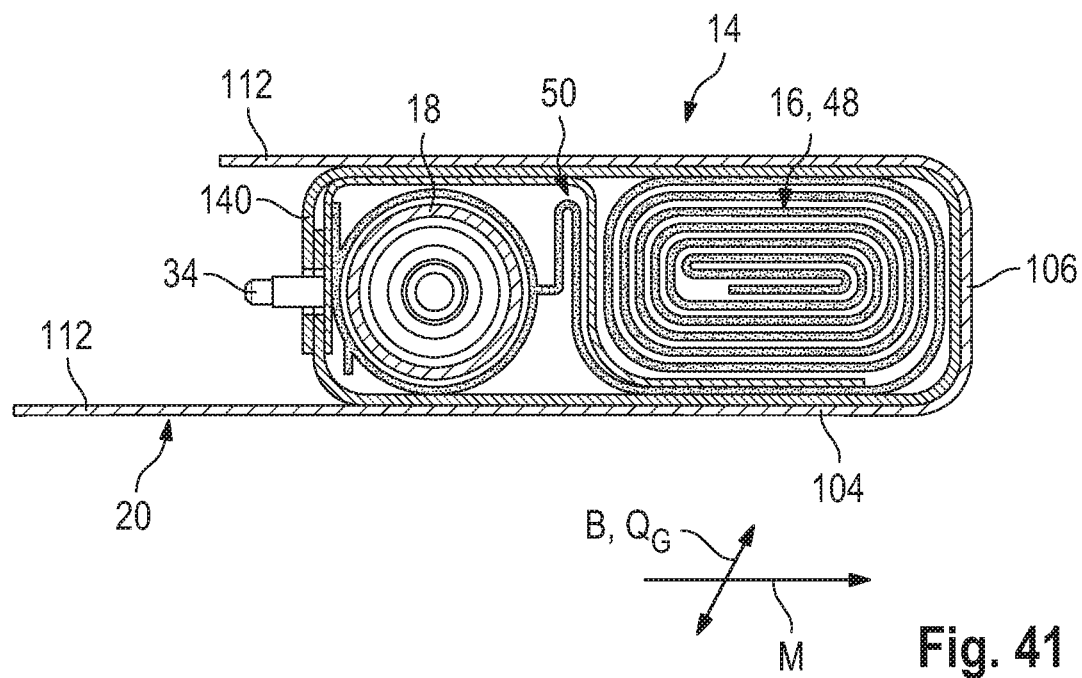

The airbag package 14 tightly enclosed by the intermediate cover 140 now is inserted into the wrapping 20, with the main package 48 being slid into the holding bag 104 (see FIG. 41).

Figure 42:
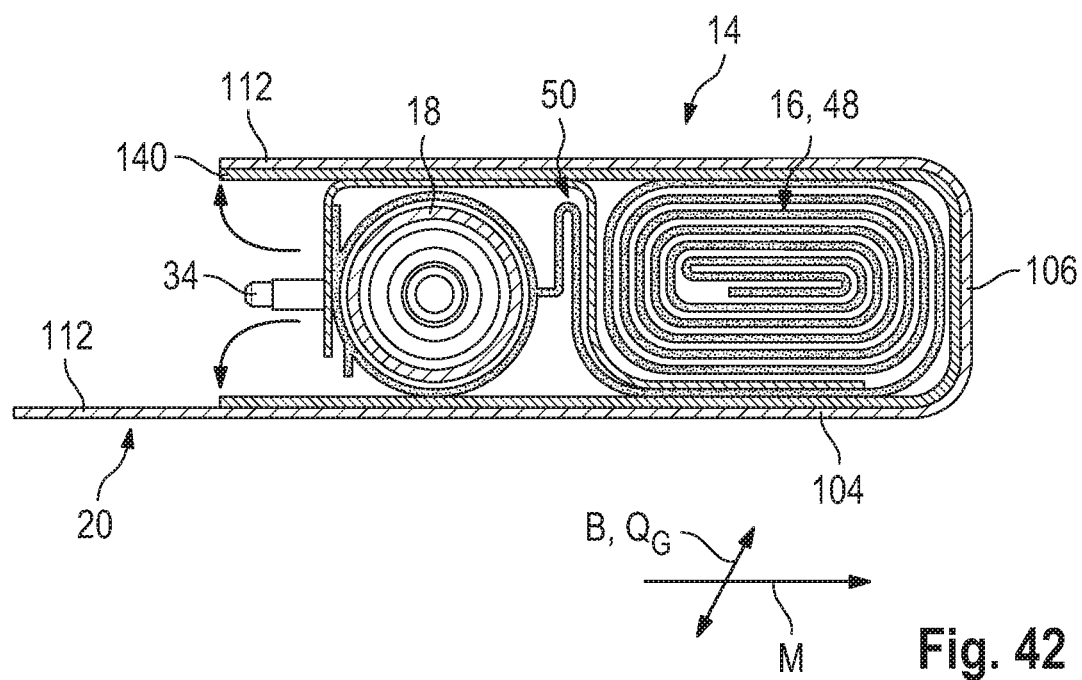

Now the intermediate cover 140 is opened again by the two ends thereof being removed from the bolts 34, 42 of the inflator 18. This is shown in FIG. 42.

Figure 43:
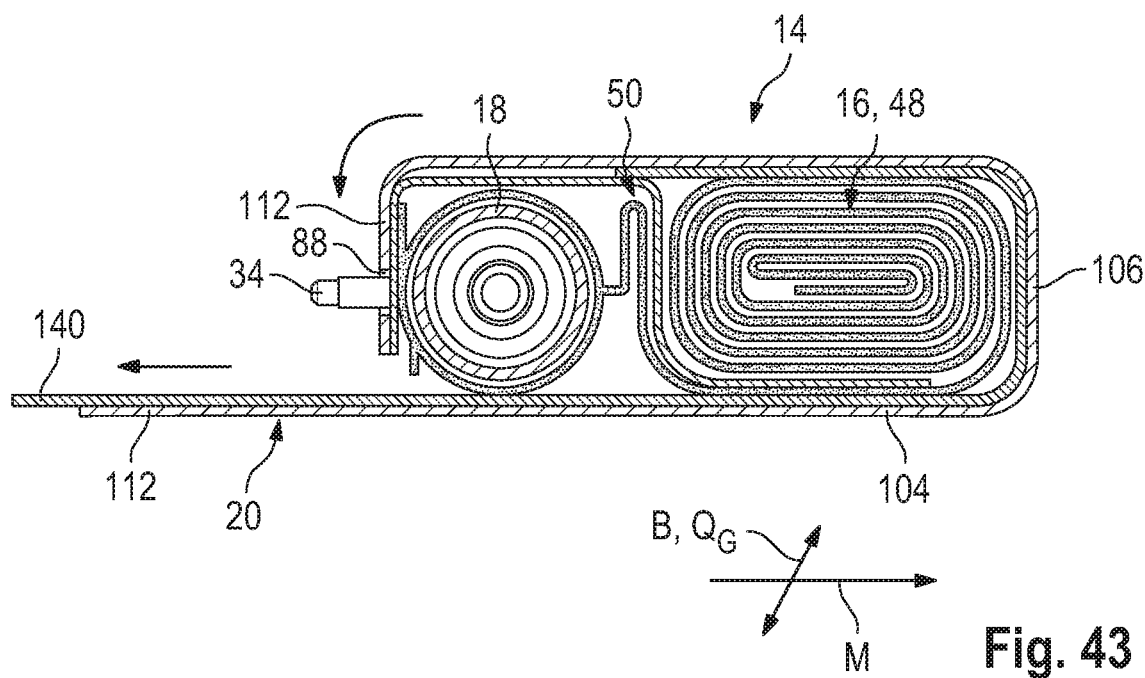
Figure 44:
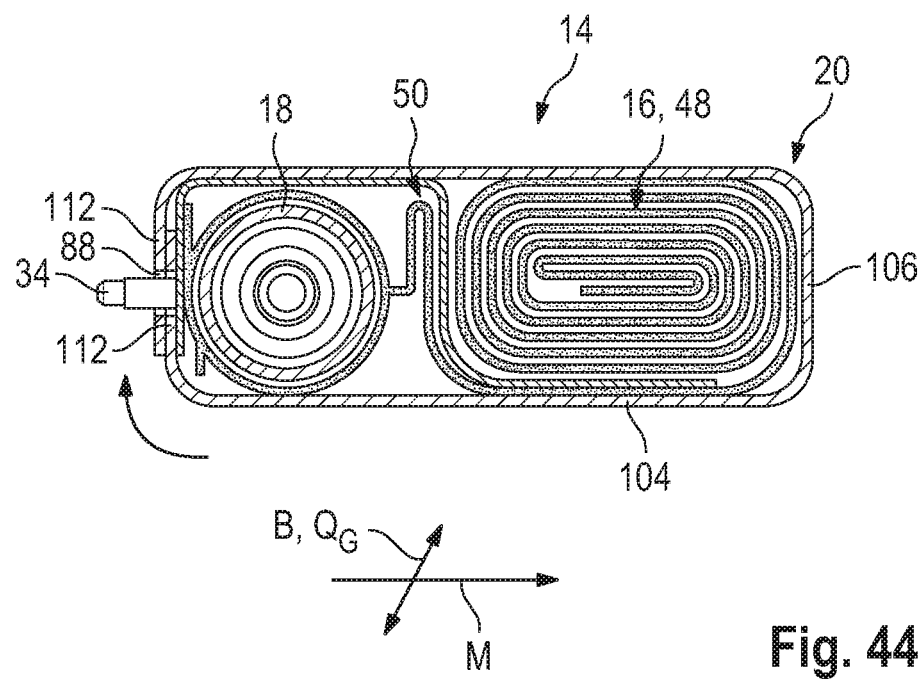

Either of the two retaining tabs 112 of the wrapping 20 is pulled over the bolts 34, 42 of the inflator 18 so as to fix the wrapping 20 to the inflator 18. Now the intermediate cover 140 can be removed from between the airbag package 14 and the wrapping 20, as illustrated in FIG. 43. In so doing, the folding especially of the connecting portion 50 cannot change any more, as the one retaining tab 112 already connected to the inflator 18 maintains the airbag package 14 in its desired shape.

After removing the intermediate cover 140 also the second retaining tab 112 is closed by the holes thereof being pulled over the bolts 34, 42 of the inflator 18.

Finally, the airbag package fixation 124 is closed by pulling the bracket 118 over the inflator 18 and the retaining tabs 112 surrounding the same, by sliding the web 122 beneath the second cut part 103 and by closing the fixing elements 126, 128, as described above.

The invention claimed is:

1. A vehicle occupant restraint system comprising:
   an airbag;
   an inflator that upon activation supplies filling gas for the airbag; and
   a module carrier configured to be connected to a vehicle roof;
   wherein the module carrier comprises an inflator holder configured to receive and connect with the inflator, and end portions configured to receive and connect with visor attachments of a sun visor, the end portions being positioned at opposite ends of the inflator holder so that the inflator, when connected to the inflator holder, is positioned between the end portions;
   wherein prior to activation the airbag is folded to form an airbag package together with the inflator, wherein through the connection of the inflator to the inflator holder, the module carrier is configured to support the airbag package with the inflator positioned between the visor attachments and the folded airbag positioned substantially forward of a sun visor pivot axis, between the sun visor pivot axis and a windshield of the vehicle.

2. The vehicle occupant restraint system according to claim 1, wherein, in an inflated state, the airbag extends from the area of the sun visor along the windshield and across an instrument panel in the direction of a vehicle occupant.

3. The vehicle occupant restraint system according to claim 1, wherein, in a completely inflated state, the airbag includes a first free end which forms a lower end of the airbag in the vehicle interior and a second free end which lies within the area of a lower end of a windshield of the vehicle.

4. The vehicle occupant restraint system according to claim 1, wherein the airbag package is surrounded by a fabric wrapping.

5. The vehicle occupant restraint system according to claim 4, wherein the fabric wrapping is configured to be positioned adjacent a roof liner in an installed condition of the airbag.

6. The vehicle occupant restraint system according to claim 1, wherein the module carrier is rigid and tightly connected to a roof rail of the vehicle, wherein a passenger-side arm of the inflator holder does not extend beyond the inflator in the longitudinal vehicle direction toward a vehicle front end.

7. The vehicle occupant restraint system according to claim 1, wherein the airbag package is folded so that a main package is formed which is constituted by a restraint part of the airbag and comprises a major part of the airbag volume as well as a connecting portion is formed which comprises a neck of the airbag and which connects the main package to the inflator, with the neck being folded into one to three zigzag folds.

8. The vehicle occupant restraint system according to claim 7, wherein the connecting portion and the main package are folded and are arranged in the airbag package so that, upon activation of the inflator, first the neck will fill and will slide the main package in a still at least partially folded state into the vehicle interior.

9. The vehicle occupant restraint system according to claim 7, wherein in the deployed and inflated airbag the neck is narrower than the restraint part in a transverse vehicle direction.

10. The vehicle occupant restraint system according to claim 1, wherein the airbag includes an inflation end having an inserting hole for the inflator which is closable by two opposite tabs of the inflator, each tab being adapted to be fastened separately to the inflator.

11. The vehicle occupant restraint system according to claim 10, wherein each tab includes at least one fastening hole for accommodating a fastening bolt projecting from the inflator.

12. The vehicle occupant restraint system according to claim 11, wherein the two tabs overlap on a rear side of the inflator.

13. The vehicle occupant restraint system according to claim 10, wherein the inflator includes at least one fastening bolt, and a positioning bolt projecting from the inflator's outer periphery which is arranged so that definite positioning of the inflator inside the airbag is enabled and that each tab of the inflation end includes a positioning hole for accommodating the positioning bolt.

14. The vehicle occupant restraint system according to claim 1, wherein the airbag is configured to deploy through a passage between a roof liner and the vehicle roof along the windshield.

15. The vehicle occupant restraint system according to claim 1, wherein the entirety of the airbag positioned forward of the inflator is positioned between the pivot axis and the windshield.

16. The vehicle occupant restraint system according to claim 1, wherein the airbag module is free from a rigid casing for enclosing the airbag in the package.

17. The vehicle occupant restraint system according to claim 1, wherein the inflator holder comprises a C-shaped holder comprising fastening holes for receiving fastening bolts of the inflator, wherein the C-shaped holder is open in vehicle forward and downward directions.

* * * * *